United States Patent [19]

Tinder et al.

[11] Patent Number: 5,063,536
[45] Date of Patent: Nov. 5, 1991

[54] MICROPROGRAMMABLE ASYNCHRONOUS CONTROLLERS FOR DIGITAL ELECTRONIC SYSTEMS

[75] Inventors: Richard F. Tinder, Pullman; Richard I. Klaus, Vancouver, both of Wash.

[73] Assignee: Washington State University Research Foundation, Inc., Pullman, Wash.

[21] Appl. No.: 167,311

[22] Filed: Mar. 11, 1988

[51] Int. Cl.$^5$ .............................................. G06F 7/00
[52] U.S. Cl. ................................. 395/775; 364/97.75; 364/950; 364/950.1; 364/950.5; 364/DIG. 2
[58] Field of Search ................... 364/200 MS, 900 MS

[56] References Cited

U.S. PATENT DOCUMENTS

| | | | |
|---|---|---|---|
| 4,167,789 | 9/1979 | Faustini | 364/900 |
| 4,390,969 | 6/1983 | Hayes | 364/900 |
| 4,594,651 | 6/1986 | Jaswa et al. | 364/131 |
| 4,615,017 | 9/1986 | Finlay et al. | 364/900 |
| 4,845,712 | 7/1989 | Sanner et al. | 364/200 |
| 4,962,474 | 10/1990 | Kreiser | 364/900 |

OTHER PUBLICATIONS

Molnar, C. E., "Introduction to Asynchronous Systems", *New Frontiers in Computer Architecture Conference Proceedings* (1986), p. 83.

Nordmann, B. J., and McCormick, B. H., "Modular Asynchronous Control Design", *IEEE Trans. on Computers*, vol. C-20 (1977).

Primary Examiner—Gareth D. Shaw
Assistant Examiner—Kevin A. Kriess
Attorney, Agent, or Firm—Wells, St. John & Roberts

[57] ABSTRACT

An electronic asynchronous digital controller for use in microprocessors, computers and other digital systems. The controller stores a present state code which is classified into one of at least two state code classes, such as in either even or odd parity. A programmed instruction subsystem analyzes system inputs and present state code information to provide transition instructions indicating whether a state code transition should occur and the appropriate type of transition. Circuitry is included to assure that transitions only occur from one state code class into a different state code class, preferably by changing a single state code bit. Transition can also only progress if all previous transitions have been completed. The invention further includes methods for asynchronously controlling digital systems.

56 Claims, 20 Drawing Sheets

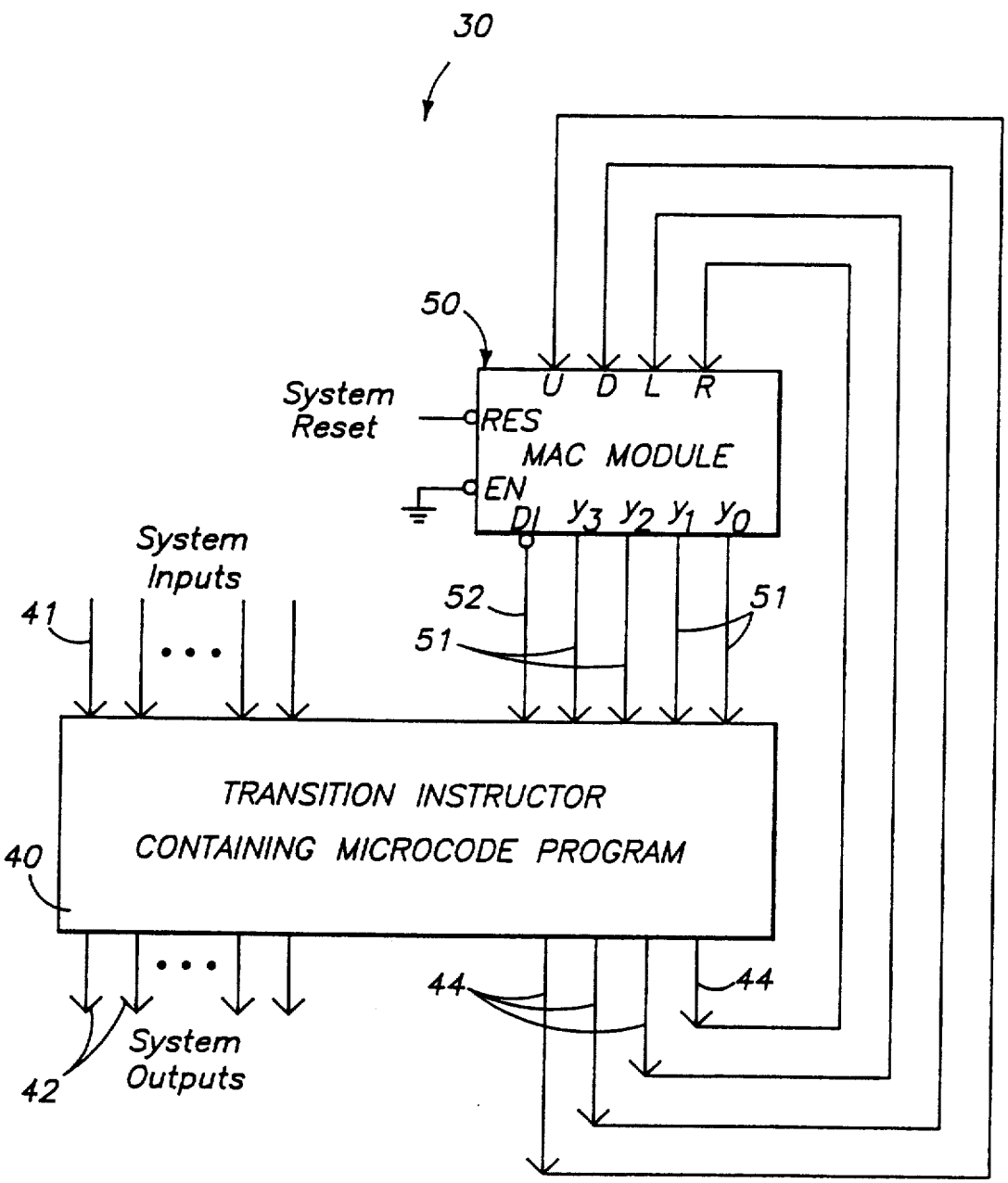

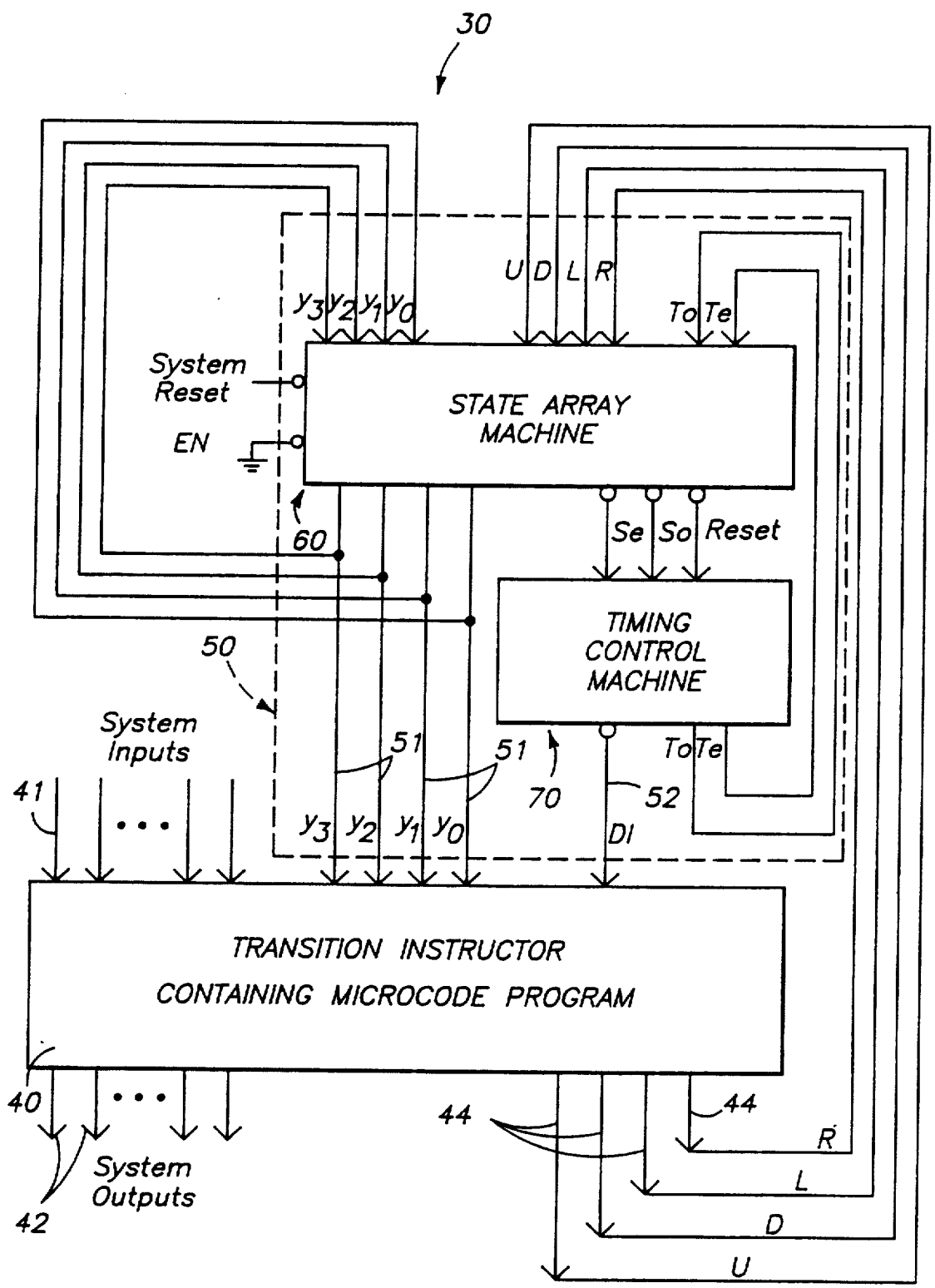

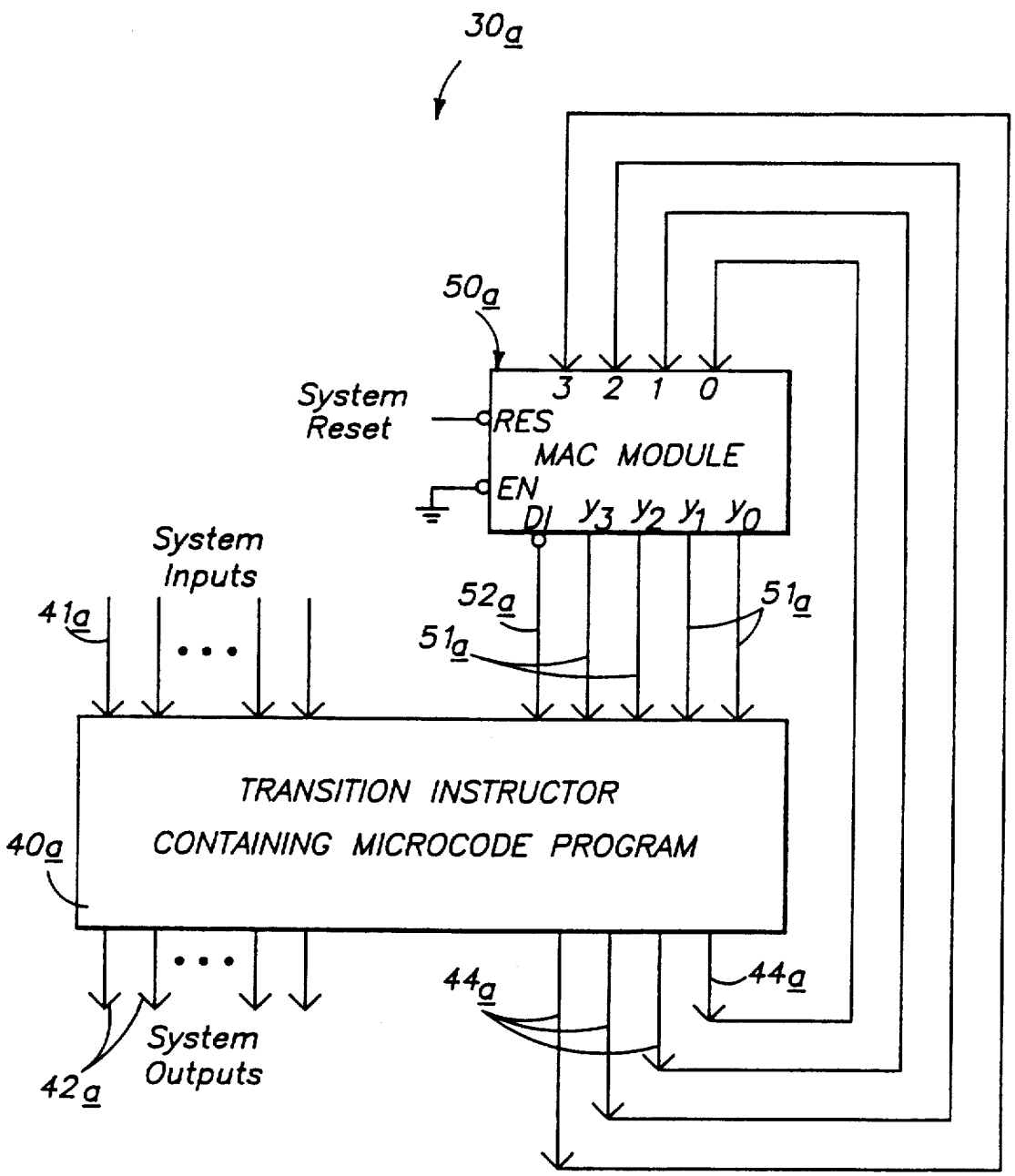

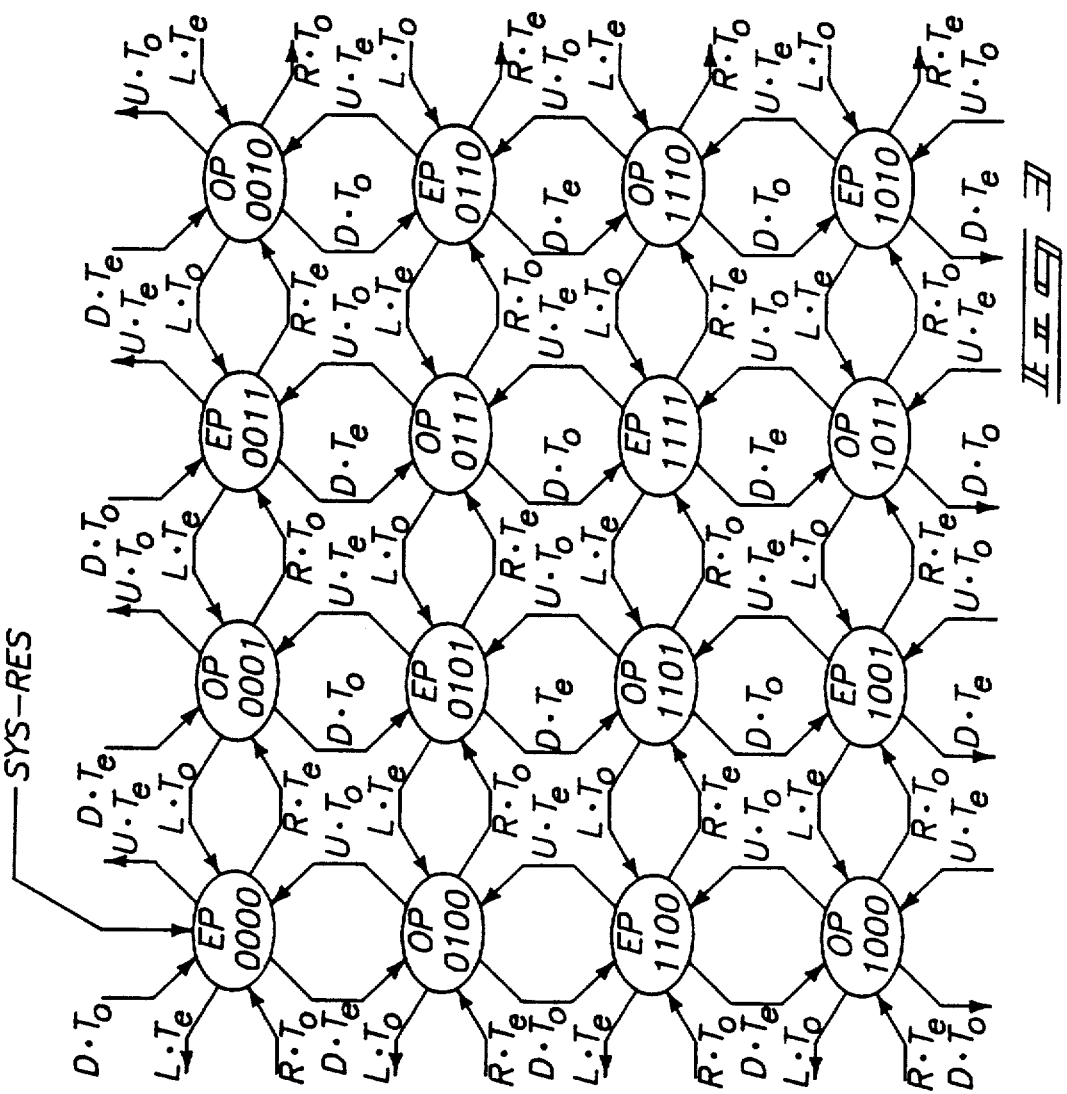

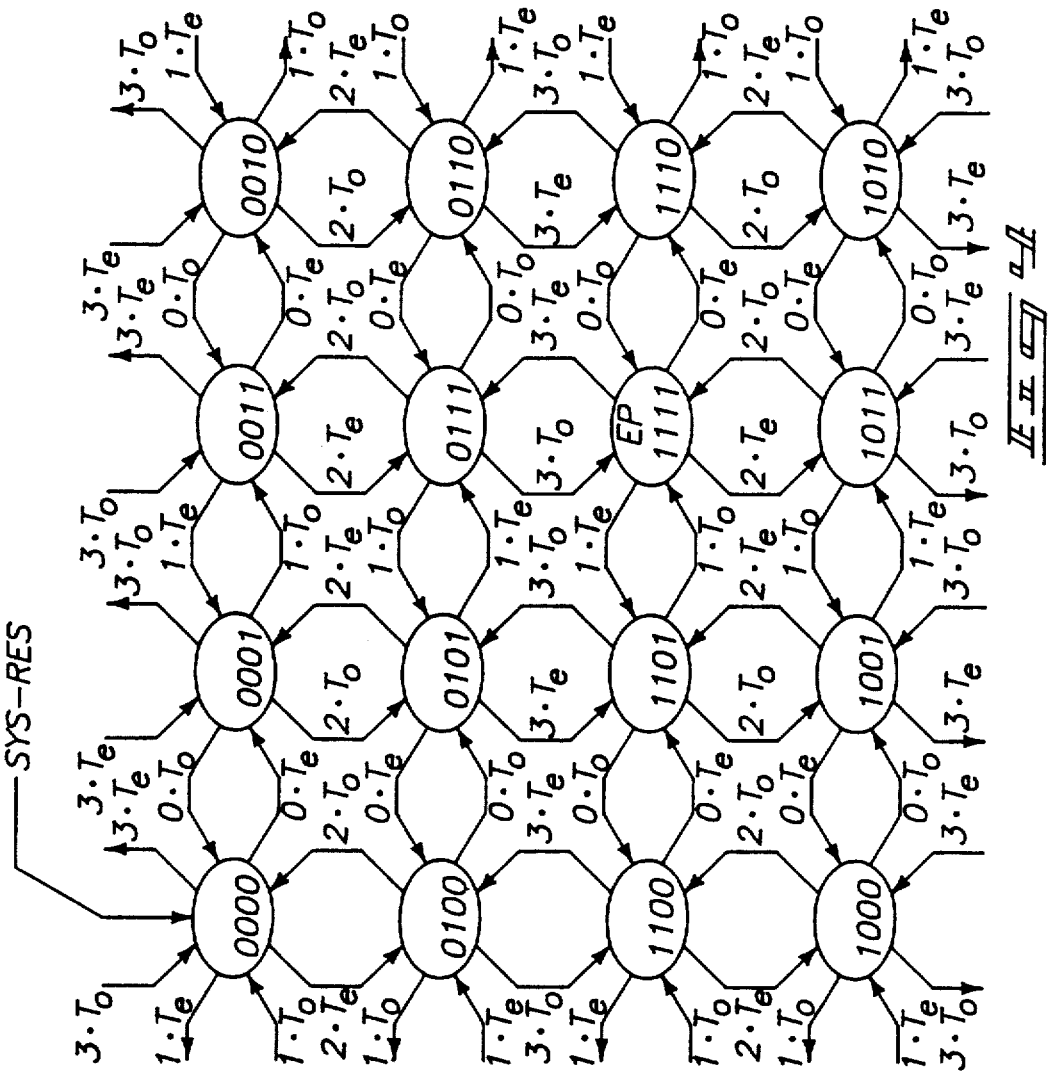

IN-BRANCHING CONDITIONS

STATE ARRAY MACHINE $2 \cdot Te$
$1 \cdot Te$
$0 \cdot Te$
$(n-1) \cdot Te$

ODD PARITY STATE
$y_{n-1} \cdots y_2 y_1 y_0$
(STATE CODE)

$0 \cdot To$
$1 \cdot To$
$2 \cdot To$
$(n-1) \cdot To$

OUT-BRANCHING CONDITIONS

STATE HOLDING CONDITIONS:

$\overline{To} + \overline{(n-1)} \cdots \overline{2} \cdot \overline{1} \cdot \overline{0} = 1$

STATE OUTPUTS:

Present State Code $So \Uparrow$ if $\overline{Te} \cdot [(n-1) \cdots + 2 + 1 + 0] = 1$
Reset $\Uparrow$ if $[\overline{(n-1)} \cdots \overline{2} \cdot \overline{1} \cdot \overline{0}] = 1$

Fig. 7

IN-BRANCHING CONDITIONS

STATE ARRAY MACHINE $2 \cdot To$
$1 \cdot To$
$0 \cdot To$
$(n-1) \cdot To$

EVEN PARITY STATE
$y_{n-1} \cdots y_2 y_1 y_0$
(STATE CODE)

$0 \cdot Te$
$1 \cdot Te$
$2 \cdot Te$
$(n-1) \cdot Te$

OUT-BRANCHING CONDITIONS

STATE HOLDING CONDITIONS:

$\overline{Te} + \overline{(n-1)} \cdots \overline{2} \cdot \overline{1} \cdot \overline{0} = 1$

STATE OUTPUTS:

Present State Code $Se \Uparrow$ if $\overline{To} \cdot [(n-1) \cdots + 2 + 1 + 0] = 1$
Reset $\Uparrow$ if $[\overline{(n-1)} \cdots \overline{2} \cdot \overline{1} \cdot \overline{0}] = 1$

Fig. 8

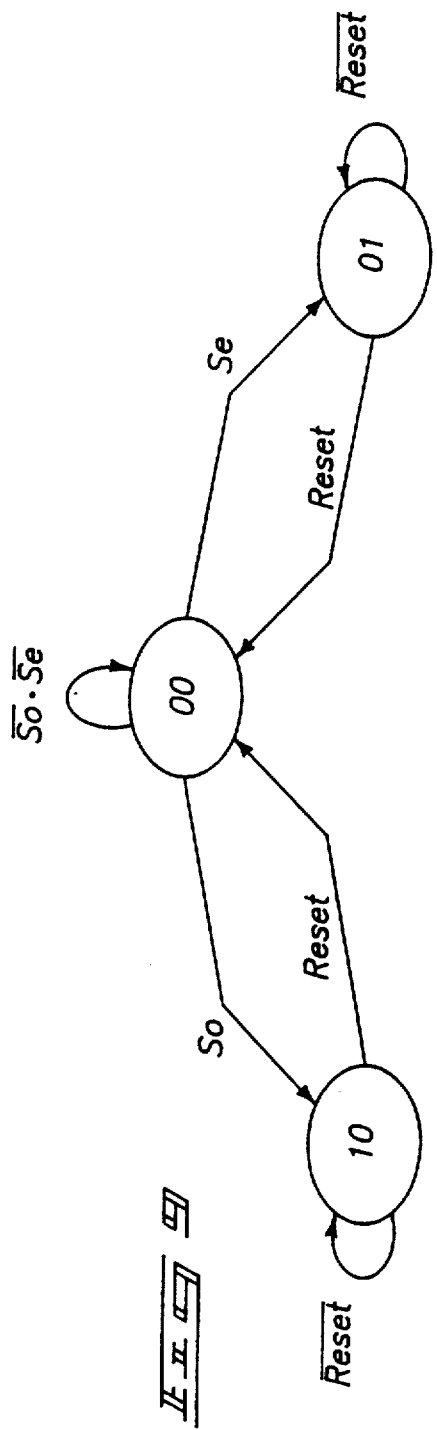
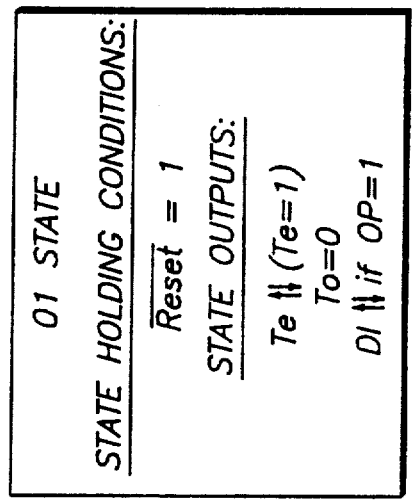
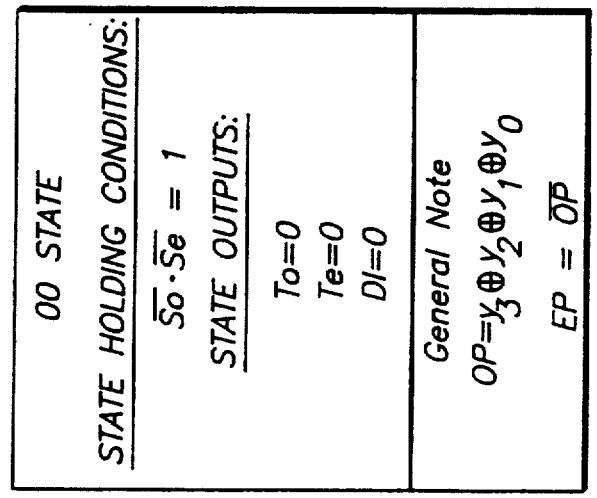
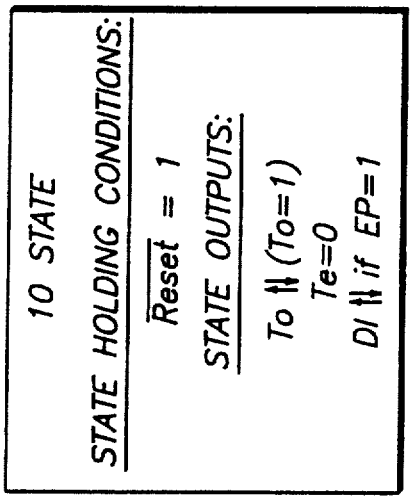
FIG. 9

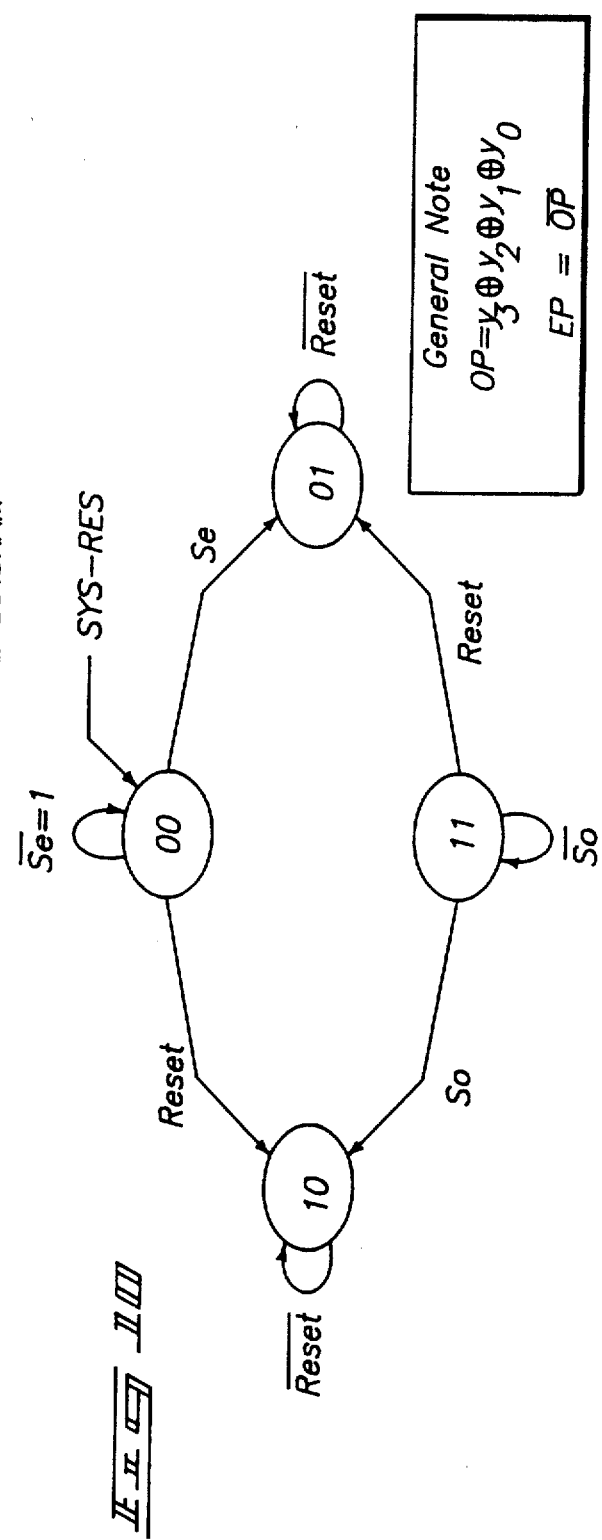

STATE ARRAY TRANSITION FROM 0000 → 0100

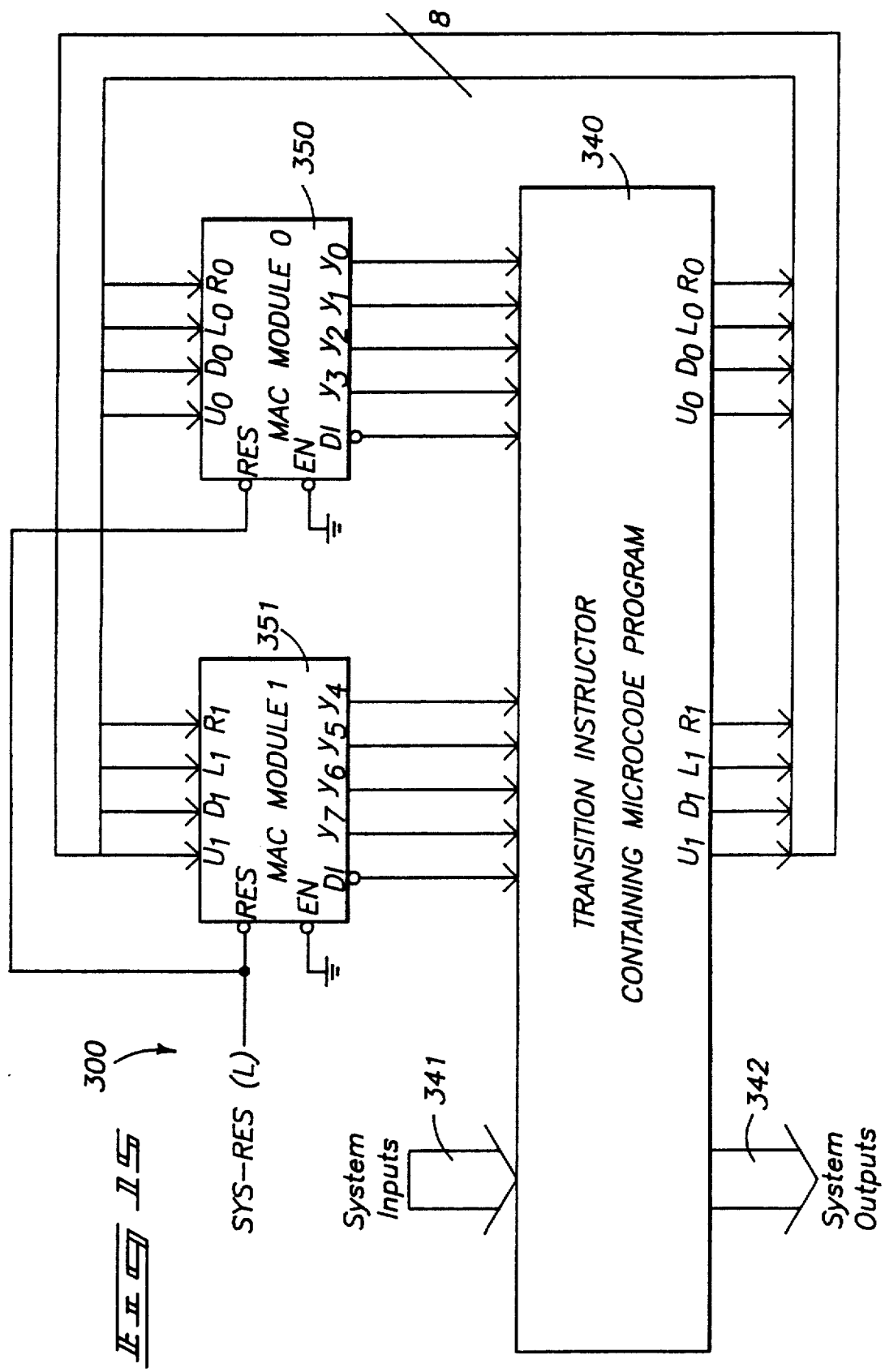

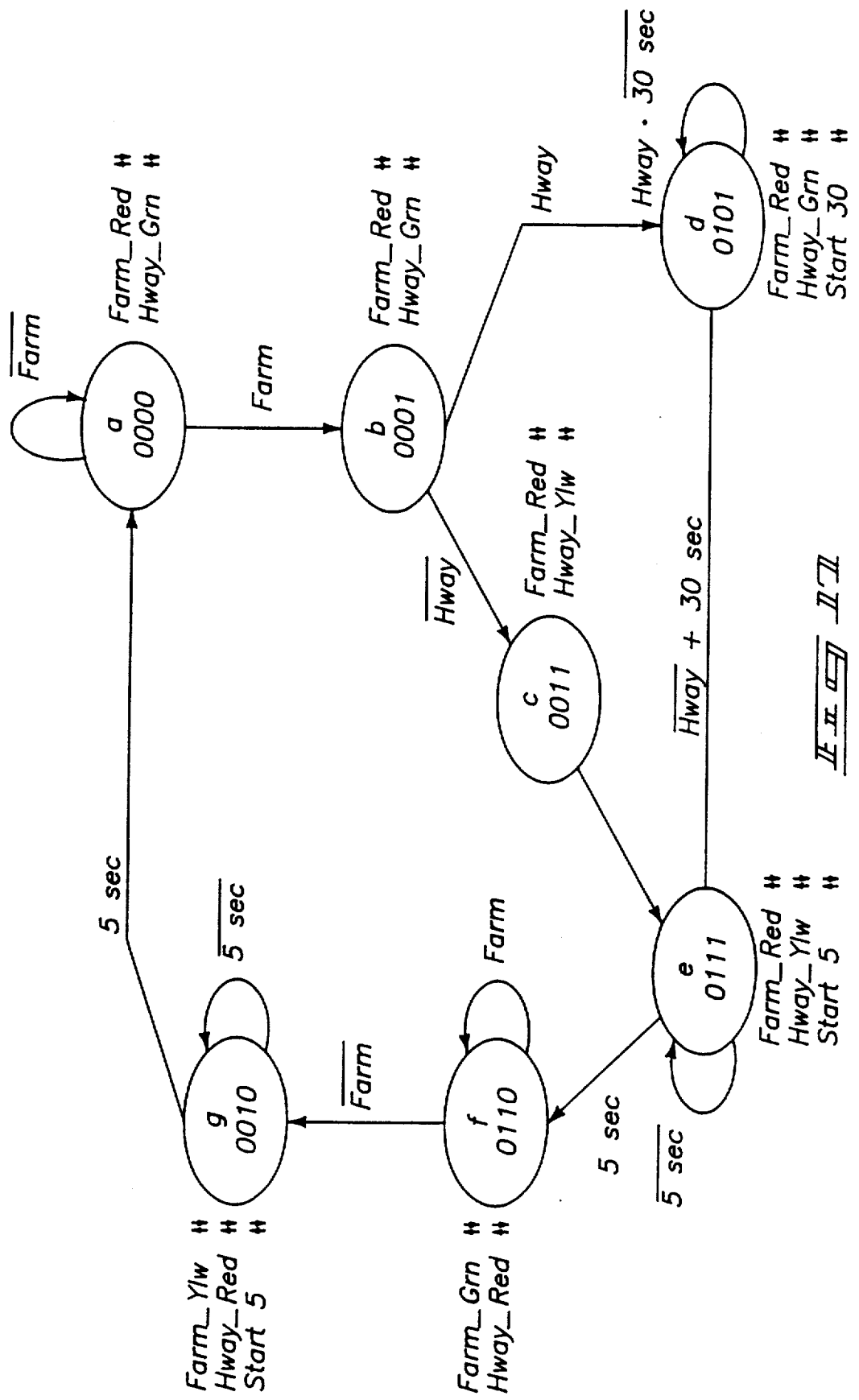

MICROPROGRAMMABLE ASYNCHRONOUS CONTROLLERS FOR DIGITAL ELECTRONIC SYSTEMS

TECHNICAL FIELD

The technical field of this invention is asynchronous controllers for digital electronic systems.

BACKGROUND OF THE INVENTION

Most digital electronic systems, such as used in computers, microprocessors, and controllers, generally employ some means for synchronizing various transitions which occur during digital processing. Typically, the synchronization is provided using a clock signal which acts as a trigger allowing various transitions from one state to another state to occur. In most synchronous sequential machines the clock signal controls data movement in the machine, thus providing sufficient time for various subcircuits to respond and achieve the desired values prior to beginning the next processing step. The triggering action of the clock provides an inherent filtering mechanism since logic noise (glitches) are not sensed by the next stage unless the noise occurs at or near the time that the clock signal triggers the digital system to transition onto the next state. The synchronization and filtering aspects of clock driven digital systems have in part been responsible for allowing large digital systems to be designed and implemented by simplifying the electronic engineering required to produce operable systems.

Despite their advantages, clock driven digital systems do suffer limitations. The frequency of the system clock must necessarily be slow enough so that all clocked components of the system can achieve proper logic stability between clock triggering intervals. This requirement causes the loss of valuable time since one component say respond more quickly than another. The reaction time of the slowest component dictates the maximum acceptable operating frequency used by the system. Thus the overall operating speed is decreased by delays which occur along the critical timing paths for each electronic stage which respond faster than the duration of the clock interval.

Another difficulty associated with synchronous or clock driven digital systems is the potential for clock distribution problems called clock skew. Clock skew occurs when complex digital systems are operated at a clock frequency too high for the individual components of the system to operate synchronously. Multiple clocked systems are particularly vulnerable to clock distribution problems. In general, the higher the clock frequency the more difficult it is to synchronize the various clocked components of a complex digital system.

Because of the problems discussed above and other difficulties, it is desirable in some applications to employ asynchronous or clock independent digital systems. Asynchronous sequential digital systems do not require a periodic triggering signal (clock) to coordinate the controller and data path. Such asynchronous sequential systems have the inherent advantage of operating without clock holdup time delay since the various components of the system do not have to wait for a clock triggering signal before proceeding on to the next step. Accordingly, asynchronous sequential systems have the potential for higher operating speeds with fewer clock distribution problems.

A number of timing defects unique to asynchronous sequential machines have prevented widespread development of these machines. One important type of timing defect is termed a race condition. A race condition exists when an asynchronous sequential machine can take two or more alternative paths to the same stable. In general, a race condition is not a severe problem unless output race glitches are produced. Even then the problem may not be disruptive to the operation of the sequential machine. Critical races, on the other hand, must never be permitted to exist. Critical races can occur when two or more alternative paths in a transition can lead to two or more distinct stable states. In such instances the destination state is not predictable and malfunction of the sequential machine is highly probable.

An endless cycle (oscillation) is another type of timing defect that can exist in asynchronous sequential machines. If present, an endless cycle is certain to cause the sequential machine to malfunction.

Asynchronous sequential machines also suffer substantially more problems than synchronous designs due to the presence of various types of hazards. Hazards are herein defined as unwanted logic level transients or error transitions. Static hazards, for example, can be identified and eliminated by means of combinational logic and, therefore, do not constitute a serious problem. Essential hazards, on the other hand, pose a very serious threat to successful operation of asynchronous sequential machines which operate in the fundamental mode, and these timing defects cannot be detected or eliminated by combinational logic means as can static hazards. If even one single essential hazard is active in a given asynchronous sequential machine and steps are not taken to eliminate it, the essential hazard will cause the machine to malfunction. Essential hazards can be eliminated only be placing delays on feedback lines and this slows down circuit response. More than any other timing defect, essential hazards are responsible for a general opinion among digital design engineers that asynchronous sequential machines are too complex and too unreliable to be of serious commercial interest.

The elimination of all the above potential problems in a complex asynchronous sequential system can be a formidable task requiring exhaustive analyses by digital electronic designers. The greater potential for defects of the types mentioned above to exist in asynchronous sequential machines, compared to their synchronous machine counterparts, has slowed progress in this technological area and has substantially increased developmental costs of asynchronous sequential systems. There remains a great need for development of asynchronous sequential machine technology so as to meet the needs of a next generation of microprocessors and computers which will be very complex and which will be operated at speeds in excess of those possible in a clock driven environment. Many digital design experts agree that the synchronous machine concept has already been pushed to its practical limit.

This application describes an invention which alleviates or solves at least some of the problems discussed above. The invention is programmable and includes one or more modules which can be cascaded to extend the number of control states. The programmability and expandability make devices according to the invention highly versatile and easily adaptable to a wide variety of applications. It is believed that the invention disclosed in this application will set new standards for sequential machine speed, compactness and reliability.

BRIEF DESCRIPTION OF THE DRAWINGS

Preferred embodiments of the invention are illustrated in the accompanying drawings, which are briefly described below.

FIG. 1 is a block diagram showing a preferred embodiment of a programmable asynchronous controller according to this invention. The controller consists of a single microprogrammable asynchronous controller module (MAC module) and a transition instructor containing a microcode program. This embodiment is based on direction-specific transition variable inputs which are given the preferred names up (U), down (D), left (L), and right (R). These direction based transition variables relate to graphical interrelationships between different operative states of the module as illustrated in the state diagram of FIG. 3.

FIG. 1A is a block diagram showing the controller of FIG. 1 in greater detail with the MAC module shown in terms of its principal sections, namely, a state array machine and a timing control machine.

FIG. 2 is a view similar to FIG. 1 of an alternative preferred embodiment programmable asynchronous controller. The controller of FIG. 2 is based on bit-specific transition variable inputs which are given the preferred names 3, 2, 1 and 0 to indicate the position of the bit that changes when the MAC module transitions from one state to another state as indicated in the state diagram of FIG. 4.

FIG. 3 is a fully documented state diagram showing 16 different possible states which may be assumed by a state array machine portion of the preferred 4×4 MAC module included in FIG. 1. The state diagram shows state code assignments (such as 0000), state in-branching conditions (such as D·Te) state out-branching conditions (such as U·Te), state holding conditions, and state outputs, all represented in Boolean form. This version of the state array machine is based on the direction-specific inputs, U, D, L and R as used in the embodiment of FIG. 1.

FIG. 4 is a fully documented state diagram similar to FIG. 3 for the alternative preferred embodiment controller of FIG. 2. The state diagram shows bit-specific transition inputs 3, 2, 1 and 0 as used in the embodiment of FIG. 2.

FIG. 7 is any odd parity state of a generalized state diagram based on bit-specific inputs 3, 2, 1 and 0 which is assumable by a state array machine portion of an alternative MAC module (not shown) having states defined by generalized state code variables $y_{n-1} \ldots y_2 y_1 y_0$. The state diagram also indicates in-branching conditions, out-branching conditions, state holding conditions, and state outputs all represented in Boolean form.

FIG. 8 is any even parity state of a generalized state diagram similar to FIG. 7 which is assumable by a state array machine portion of the alternative MAC module (not shown) of FIG. 7.

FIG. 9 is a fully documented state diagram showing 3 different possible operational states which may be assumed by a timing control machine portion of the MAC module included in either FIGS. 1 or 2. The state diagram shows state identification symbols (such as 00), state in-branching conditions (such as active $S_e$ signal), state out-branching conditions (such as an active Reset), state holding conditions (such as $\bar{S}_o \cdot \bar{S}_e$), and state outputs ($T_e$ or $T_o$) all represented in Boolean form. This version of the timing control machine is based on the inputs $S_o$, $S_e$ and Reset.

FIG. 10 is a fully documented state diagram showing 4 different possible states which may be assumed by an alternative embodiment timing control machine portion of the MAC module which can be used in either of the embodiments of FIGS. 1 or 2. The state diagram shows information as indicated above in the brief description of FIG. 9. This version of timing control machine is based on the inputs $S_o$, $S_e$, Reset and SYS-RES.

FIG. 13 is a timing diagram showing various signals generated in a computer-generated operational simulation of the MAC module of FIGS. 1, 1A, 11A and 11B. The timing diagram depicts a transition from the even parity state 0000 to the odd parity state 0100.

FIG. 15 is a block diagram showing an alternative controller according to this invention. The controller utilizes two MAC modules which are cascaded to provide a greater number of possible states in the state array machine portion.

BRIEF DESCRIPTION OF THE TABLES

Figure 5:
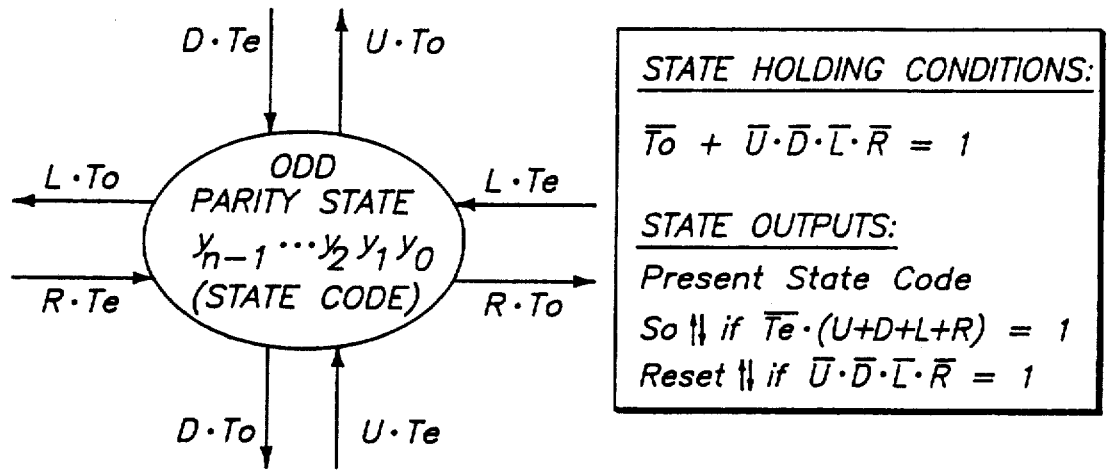
FIG. 5 is any odd parity state of a generalized state diagram which is assumable by the state array machine portion of the MAC module included in FIG. 1 and which assumes the use of direction-specific inputs U, D, L and R. The state diagram indicates the general form of the state code, state in-branching conditions, state out-branching conditions, state holding conditions, and state outputs all represented in Boolean form.

Table I is an optimized programming table for a programmable logic array (PLA) used in the direction-specific version of the MAC module represented in FIGS. 1, 1A, 3, 9, 11A and 11B. This table is given in positive logic form and assumes that EN=1 which enables the direction-specific inputs U, D, L and R. The eleven inputs to the product terms (p-terms) are shown on the left side of the table and are represented by logic 0 if complemented, by logic 1 if uncomplemented or by a dash (—) if absent in the p-term. The 1's and 0's in the four output columns on the right side of the table indicate that a p-term is present or absent in the state code output, respectively.

Tables II is an optimized PLA programming table for the bit-specific version of the MAC module represented in FIGS. 2, 4, 9, 12A and 12B. This table is given in positive logic form and assumes that EN=1 which enables the bit-specific inputs 3, 2, 1 and 0. The symbols in Table II have the same meaning as described above with respect to Table I.

Table III is an optimized PLA programming table for a transition instructor microcode program used in the traffic light controller of Example 1.

Table IV is a read only memory (ROM) programming table for a transition instructor microcode program used in the sequence recognizer described in Example 2. This table offers two different configurations, one using a single 4×4 version of the MAC module, and a second that uses two 2×2 MAC modules in a bit-sliced configuration similar to that described with respect to FIG. 15.

Table V is an optimized PLA programming table for the sequence recognizer of Example 2.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

FIG. 1 shows a preferred form of electronic microprogrammable asynchronous controller (MAC) 30 according to this invention. Controller 30 includes a transition instructor 40 and a microprogrammable asynchronous controller module (MAC module) also herein called control module 50. FIG. 1A shows controller 30 in more specific terms than FIG. 1 with the control module 50 represented by using two interdependent asynchronous finite state machines herein termed a state array machine section 60 and a preferred timing control machine section 70. These two machines communicate to each other by means of a unique handshake interface 60 which is described below. The transition instructor, state array machine and timing control machine further interact in a distinctive and novel way which will be described more fully hereinafter. FIGS. 1 and 1A show signals which come from external equipment (system inputs), the internal signals communicated between the sections of the controller, and the output signals to the system being controlled (system outputs).

The transition instructor 40 acts to receive information for the controller from one or more of the system inputs 41. The system inputs can be from sensors or related digital equipment which generate a suitable signal or signals which are preferably encoded in binary form. The system inputs are the externally generated conditions which govern operation of the controller.

Transition instructor 40 also receives input signals from the control module 50, preferably in the form of binary signals $y_3, y_2, y_1, y_0$ and DI which will be explained below. Some of the information input to the transition instructor from the control module represents a present state which the control module has assumed. The present state of the control module is transmitted using state code conductors 51 which carry the state code signals $y_3, y_2, y_1,$ and $y_0$. The transition instructor generates the correct next state instruction inputs to the MAC module based on the external system inputs and on the present state data $(y_3, y_2, y_1, y_0)$ received from the control module, all according to an algorithm programmed into the transition instructor.

A further input to the transition instructor from the MAC module is given the preferred name DI for deactivate inputs. The purpose of the DI signal is to deactivate all next state transition instructions to the MAC module immediately following the completion of each state array machine transition which changes the present state code. This deactivation prevents any further issuance of transition instructions to the module thereby allowing the module to completer a state code transition and prepare for the next transition instructions. This deactivation operation ensures the orderly transitions of the control module and eliminates the possibility of certain timing defects. The DI signal can function in various manners using various electronics to deactivate input of the transition instructions.

Transition instructor 40 has a set of output signals 44 which control the type of state code transition which occurs in the control module 50. The preferred transition instructions are binary signals and can be represented by the letters U, D, L and R. The letters U, D, L and R are representative of the directions up (U), down (D), left (l) and right (R). These are the direction-specific inputs which control transitioning between control module states, as shown in the state diagram of FIG. 3. The transition instructions are used by the control module to define the next state which will be assumed by the control module.

The preferred form of transition instructor 40 also provides system outputs 42 which are preferably binary signals communicated to related equipment (not shown) which is being controlled by controller 30.

The transition instructor can be embodied in various electronic forms, such as a programmable logic array or read only memory. Transition instructor 40 functionally provides a particular set of digital output signals 42 and 44 for a given set of digital inputs signals 41, 51 and 52. The type of electronic structure used to accomplish this function may vary as electronics improve or new techniques develop. The current preferred structure is a programmable logic array. The size and configuration of the programmable logic array or other device used will vary with the requirements of the system being controlled, including the number of sensory or other system variables, the number of output variables being controlled by controller 30, the number of product terms (p-terms) needed to fully represent the control function, and the number of different control states needed to adequately describe and operate the system being controlled.

Figure 11A:
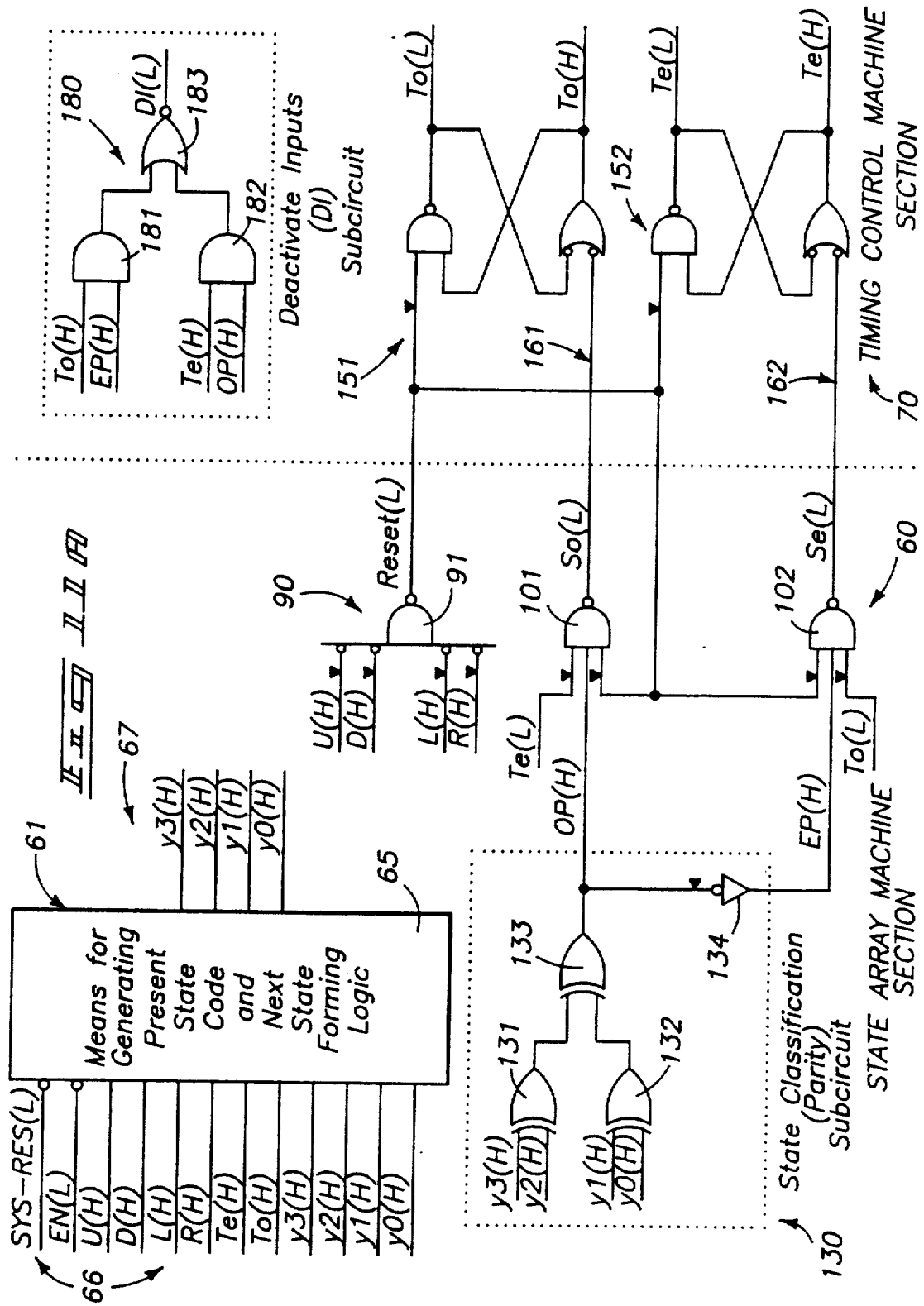
FIG. 11A is a logic diagram showing a preferred from a MAC module used in the controller of FIGS. 1 and 1A. The diagram shows both state array and timing control machine portions which utilize the direction-specific transition variable inputs to assume the states as indicated in the state diagrams of FIGS. 3 and 9, respectively. The diagram is presented in a modern mixed rail notation which will be explained more fully hereinafter.

FIGS. 11A and B show that state array machine 60 includes a present state code storage means 61 which outputs information indicating the present state code which is being assumed by state array machine 60. The state code is advantageously in the form of a unique combination of binary outputs such as state code signals $y_3, y_2, y_1, y_0$ on output conductors 67. The state code can also be represented by a four place binary number such as 1010, where $y_3 = 1$; $y_2 = 0$; $y_1 = 1$; and $y_0 = 0$. The particular format or coding used to represent the state code can vary to provide different numbers of total states as needed to define the number of different control states required for the system being controlled. State codes having 2 or more bits are preferred. The preferred form of the control (MAC) module 50 shown and described herein uses four binary signals to define a four bit state code thus providing a maximum of sixteen different states which can be assumed by the means for storing the present state code 61.

The means for storing the present state code can be various different electronic structures providing the necessary functions, such as read-only-memory (ROM), programmable ROM (PROM) and erasable programmable ROM (EPROM). The current preferred electronic structure is in the form of a programmable logic array 65 having inputs 66 which will be described more fully hereinafter. Programmable logic array 65 provides a particular present state code output which is a function of the various combinations of input signals 66. A programming table for such an input-output function is described hereinafter. Programmable logic array 65 also advantageously functions as a means for transitioning the state code by allowing certain inputs to trigger change of the state code output based on the present state code at the time of transitioning and the transition instruction received. PLA 65 thus functions as a next state logic forming circuit in addition to serving as a means for storing the present state code and as a means for transitioning the state code.

FIG. 3 is a state diagram showing one possible scheme for defining the various states which may be assumed and the state transitions which may occur for the state array machine included in the embodiment of FIGS. 1 and 1A. FIG. 3 shows sixteen different states, graphically shown as ovals, which are uniquely identified, such as by using the four bit binary state codes 0000-1111. State array machine 60 can assume any of these sixteen states by providing the appropriate binary representation using outputs $y_3$, $y_2$, $y_1$, and $y_0$; with $y_0$ being the least significant bit and $y_3$ the most significant bit.

State array machine 60 is preferably only capable of the transitioning out of a particular state into another state as indicated by the transition arrows pointing away from the particular state of interest and toward the new state to be assumed. The state array shown in FIG. 3 is defined so as to allow branching or transitioning in either of four directions, namely: up (U), down (D), left (L), or right (R). Transitions from one state into another state are only accomplished when both a transition instruction (U, D, L or R) is given and a transition command or trigger signal $T_o$ to $T_e$ is also asserted from the timing control machine 70.

The arrangement of states in the state diagram of FIG. 3 also shows an important transitioning feature. This feature requires that consecutive states assumed by the state array machine in time be of different state classes. In many preferred embodiments, the number of present state code classes is only two and can most easily be implemented as even and odd parity states. An odd parity state (OP) is one in which the present state code, as represented in binary form, has an odd number of 1's; for example, 0001, 0111, etc. Conversely, an even parity state (EP) is defined to be one which includes an even number of 1's in the binary present state code; for example, 0000, 1010, 1111, etc. FIG. 3 indicates that transitioning from any of the eight even parity states leads to assumption of an odd parity state in the next consecutive state and vice versa for any possible branching direction between all possible states. For example, transitioning from an even state such as 1111 in the up direction leads to assumption of the odd parity state of 0111. Transitioning in the down direction leads to assumption of the odd parity state of 1011. Transitioning in the left direction leads to assumption of the odd parity state 1101, and in the right direction leads to the assumption of the odd parity state of 1110. Similar odd-even parity relations exist for each state and the next state which can be assumed immediately after that state by state array machine 60.

FIG. 3 also indicates that transitioning of the state array machine from an odd parity state to an even parity state requires an odd state transition command signal, $T_o$, to be issued from the timing control machine and received by the state array machine. Transitioning of the state array machine from an even state to an odd state requires an even state transition command signal, $T_e$, from the timing control machine. Such transitioning thus requires assertion of both a branching or directional instruction (U, D, L or R) from the transition instructor 40 and a transition command signal ($T_o$ and $T_e$) from the timing control machine 70. The transition command or trigger signals, must be of the proper classification or parity depending upon the classification of the present state of the state array machine.

The branching or transition conditions shown in FIG. 3 are expressed in graphical form by the arrows and by the Boolean conditions including the ANDed combinations of the direction-specific inputs U, D, L and R and the timing control parameters $T_e$ and $T_o$ which must be satisfied (true or equal to 1) for transition to occur. Examples of transition conditions are $L \cdot T_e$ and $R \cdot T_o$. A transition from one state to another cannot take place until the branching conditions are satisfied. For example, a direct transition from state 0000 to state 0001 can occur only if the condition $R \cdot T_e$ is true, or branching from state 1101 to state 0101 is possible only if $U \cdot T_o$ is true, etc.

The legend of the state diagram of FIG. 3 has also been included to indicate the holding conditions which represent the conditions under which there is no change in the present state code of state array machine 60. When the state array machine is in an even parity state such state is held or maintained when the Boolean expression $\overline{T_e} + U \cdot D \cdot L \cdot R$ is true (equal to 1). The (+) and (·) symbolize the Boolean operations OR and AND, respectively. The bars represent Boolean complementation. When the state array machine is in an odd parity state then such state is held or maintained when the Boolean expression $\overline{T_e} + U \cdot D \cdot L \cdot R$ is true (equal to 1).

The legend of FIG. 3 further has been drafted to indicate the outputs from the state array machine. The first set of outputs are the present state code output variables $y_3, y_2, y_1, y_0$ as discussed above, which are indicated in FIG. 3 by the binary state codes 0000–1111 included in the ovals. The outputs from state array machine 60 further include timing control initiation or request signals $S_o$ and $S_e$, and a transition completion signal or reset signal (Reset), all of which are input to the timing control machine 70 to govern its operation as will be explained more fully below. The conditional nature of the state array machine outputs $S_o$, $S_e$ and Reset are presented in condensed notation in the legend of FIG. 3. These output variables are followed by up and down arrows. The up arrow indicates that the output signal is asserted or active when the state array machine either is unconditionally asserted in that state or satisfies any conditional Boolean expression which follows that output variable symbol. The down arrow indicated that the output is de-asserted when the state array machine is no longer in the state or that the inputs do not satisfy any conditional Boolean expression which follows. The output functions given in FIG. 3 indicate that the state array machine outputs $S_e$, $S_o$ and Reset are conditional by using the "if" prior to the Boolean function upon which assertion or de-assertion of the output is dependent. The state array machine output $S_e$ is asserted if $[\overline{T_o} \cdot (U+D+L+R)] = 1$ and even parity exists in the present state code of the state array machine. This can also be written as $S_e$ is asserted only while $[\overline{T_o} \cdot (U+D+L+R) \cdot EP] = 1$ where $EP = 1$ when even parity exists. The state array machine output $S_o$ is asserted if $\overline{T_e} \cdot (U+D+L+R) = 1$ and odd parity exists in the present state code of the state array machine. This expression can also be written $S_o$ is asserted only while $[\overline{T_e} \cdot (U+D+L+R) \cdot OP] = 1$, where $OP = 1$ when odd parity exists. The Reset signal is asserted if $\overline{U} \cdot \overline{D} \cdot \overline{L} \cdot \overline{R}$ is true, whether even or odd parity exists. This can also be written Reset is asserted only while $\overline{U} \cdot \overline{D} \cdot \overline{L} \cdot \overline{R} = 1$.

Figure 6:
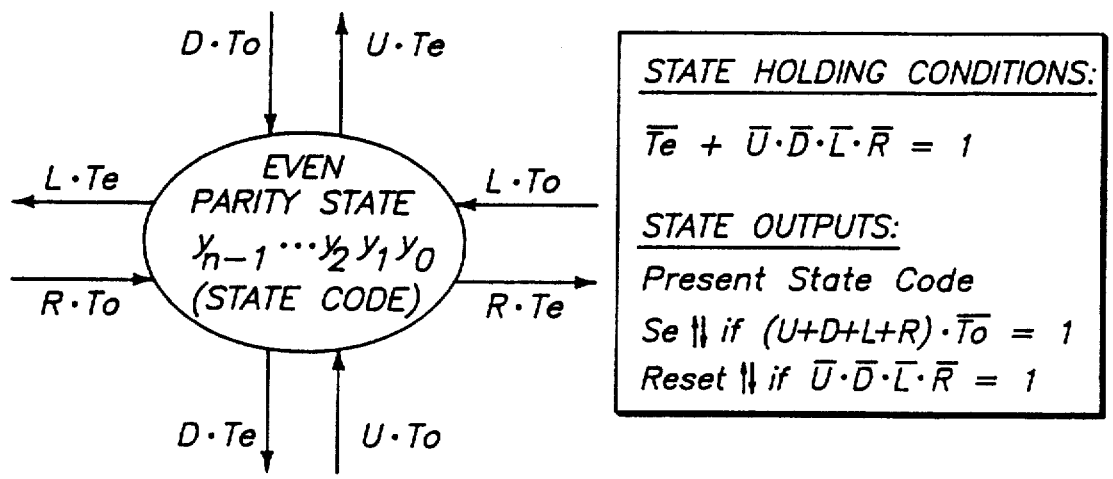
FIG. 6 is any even parity state of a generalized state diagram which is assumable by a state array machine portion of the MAC module included in FIG. 1. The state diagram indicates the same information discussed in the brief description of FIG. 5.

FIGS. 5 and 6 show more generalized state diagrams for odd and even parity states of a state array machine, such as state array machine 60. These diagrams are similar to the odd and even parity states shown in FIG. 3. The state code is shown in the more general form $y_{n-1} \ldots y_2 y_1 y_0$. The in-branching conditions, out-branching conditions, holding conditions and outputs are also indicated as described above with respect to FIG. 3.

FIG. 9 shows a state diagram for a preferred form of the timing control machine 70 used in controller 30. This operational version of the timing control machine has three possible states which can be identified by the preferred timing control state identifiers (0, 0), (0, 1) and (1, 0) shown within the ovals which graphically represent the different operational states which can be assumed by this section of the control module. These states can more compactly be referred to as 00, 01, and 10, states respectively. The holding condition for state 00 is represented by the Boolean expression $\overline{S_o} \cdot \overline{S_e}$, which if true (equal to 1) results in maintenance of the same operational state by the timing control machine 70. In the 00 state, the output from the timing control machine via binary output transition command signals $T_e$ and $T_o$ are both unasserted ($T_e = 0$ and $T_o = 0$). The DI signal is also unasserted.

The out-branching conditions from timing control machine state 00 are graphically represented by the arrows directed to the two other states 10 and 01. Such branchings are conditioned upon assertion of either the $S_o$ or $S_e$ signals output from the state array machine 60, respectively. The timing control machine 70 is held or maintained in the 10 or 01 states if the Reset signal is unasserted ($\overline{Reset} = 1$). The timing control machine output asserts the odd transition trigger signal, $T_o$, when the timing control machine is in the 10 state. This is indicated in FIG. 9 by the $T_o$ followed by up and down arrows without condition. The timing control output signal DI is conditionally asserted by the timing control machine when in the 10 state, but only if and when the state array machine has an even parity present state code.

The timing control machine output asserts the even transition trigger signal, $T_3$, when the timing control machine is in the 01 state. This is indicated in FIG. 9 by the $T_e$ followed by up and down arrows beneath the 01 state oval. The timing control output signal DI is conditionally asserted when in the 01 state, but only if and when the state array machine has an odd parity present state code. FIG. 9 further shows the Boolean expressions for the even and odd parity output signals EP and OP which are $OP = y_3 \oplus y_2 \oplus y_1 \oplus Y_0 = \overline{EP}$ where the $\oplus$ symbol represents the Boolean EXCLUSIVE OR (XOR) connective and the bar represents Boolean complementation.

The conditional output DI has the function of deactivating all transition instructions which can be input to the control module at the completion of each transition of the state array machine to a new present state. The deactivation feature resulting from assertion of the DI output makes possible the use of fly states in controller design and eliminates the potential for formation of certain types of timing defects.

FIG. 10 shows an alternative state diagram for the timing control machine 70. In this state diagram there is an additional operative timing control state (1, 1) or 11 which can be entered from state 01 by assertion of the Reset output from the state array machine 60 input to the timing control machine. The $T_e$ and $T_o$ timing control machine output signals are both deasserted or inactive in state 11. Timing control state 11 is maintained if $\overline{S_o}$ is asserted ($S_o$ is unasserted). The outputs from the timing control machine when in state 11 are $Te = 0$, $To = 0$ and $Di = 0$.

The state diagram of FIG. 10 is also different from that of FIG. 9 in that the 10 state cannot be branched into directly from the 00 state. Instead, branching occurs in a cyclic manner from 00 to 01 to 11 to 10 and back to 00. Branching from state 00 to state 01 is achieved by assertion of the $S_e$ signal from the state array machine. Branching from state 01 to state 11 is achieved by assertion of the Reset signal by the state array machine. Branching from state 11 to state 10 is achieved by asserting the $S_o$ signal from the state array machine. Assertion of the Reset output from the state array machine as input to the timing control machine causes the timing control machine to return to the 00 state from the 10 state. The outputs and holding conditions in the 10 and 01 states are the same as for the embodiment of FIG. 9.

The operative states shown in FIG. 10 for the timing control machine perform an equivalent function to the operative states shown in FIG. 9. However, the operative scheme shown in FIG. 10 requires that the timing control machine be initialized into either the 00 state or the 11 state for initialization of the state array machine into even and odd parity states, respectively. The SYSRES input shown in FIG. 10 is the same as the SYSRES input shown in FIGS. 1, 1A and 2.

The operation of control (MAC) module 50 can be described in terms of the handshake exchange between the state array machine and the timing control machine as depicted in FIGS. 5, 6 and 9. Consider that at some point in time the state array machine 60 resides in an odd parity state, as represented in FIG. 5; and that the timing control machine is in state 00, its sampling state, so both $T_e$ and $T_o$ are inactive. When one direction-specific input (U,D,L,R) becomes active from the transition instructor, the condition $(U+D+L+R)\cdot T_e$ is satisfied and output $S_o$ is asserted by the state array machine. The $S_o$ signal is received by the timing control machine which responds by transitioning from state 00 to state 10. Upon arriving in state 10 the timing control machine asserts the $T_o$ signal unconditionally. The state array machine receives the asserted $T_o$ signal and responds by transitioning to an even parity state by out-branching from the odd parity state of FIG. 5, and in-branching into the even parity state of FIG. 6, along one of the four branching paths marked, $U\cdot T_o$, $D\cdot T_o$, $L\cdot T_o$ or $R\cdot T_o$. When the state array machine enters an even parity state, the timing control machine now asserts the DI signal, as conditioned on even parity and the 10 timing control state. The DI signal is received by the transition instructor and the inputs U,D,L,R are deactivated. This satisfies the condition $\overline{U}\cdot\overline{D}\cdot\overline{L}\cdot\overline{R}=1$ thus causing the state array machine to assert the conditional output Reset to the timing control machine. The timing control machine receives the asserted Reset signal and responds by transitioning from state 10 back to state 00. This deactivates $T_o$ and prepares the state array machine, which is now in an even parity state, for transition to an odd parity state if or when any further transition instructions are issued by the transition instructor.

Thereafter when one of the direction-specific inputs (U,D,L,R) is asserted by the transition instructor, the condition $(U+D+L+R)\cdot\overline{T}_o$ is satisfied and the state array machine asserts the $S_e$ output signal. The $S_e$ signal is received by the timing control machine causing the timing control machine to transition from state 00 to state 01. Upon arriving in state 01 the timing control machine asserts the output $T_e$ unconditionally. The state array machine receives the asserted $T_e$ signal and responds by transitioning to an odd parity state along one of the four branching paths $U\cdot T_e$, $D\cdot T_e$, $L\cdot T_e$, or $R\cdot T_e$. On entering the odd parity state the timing control machine then asserts the conditional output DI. The asserted DI signal is received by the transition instructor causing input deactivation thus satisfying the condition $\overline{U}\cdot\overline{D}\cdot\overline{L}\cdot\overline{R}=1$ and causing the state array machine to issue the Reset output. The Reset signal is received by the timing control machine which causes the timing control machine to transition from state 01 to state 00. The control module is again ready to receive an active direction-specific input. This process continues in such a sequential process until the external inputs no longer generate transition instructions in the transition instructor calling for transitions in the present state code of the MAC module.

FIG. 2 shows a preferred alternative asynchronous controller 30a according to this invention. The controller includes a transition instructor 40a similar to transition instructor 40 described above except that the controller microcode programming is different. The programming reflects a change in the MAC module 50a which utilizes bit-specific transition variables 3, 2, 1 and 0 in lieu of transition variables U, D, L and R. In general, corresponding parts of controller 30a are numbered as in controller 30 with an additional "a".

FIG. 4 shows an alternative state array diagram for control module 50a. FIG. 4 is similar to FIG. 3 in that there are sixteen different states which may be assumed which are identified by the four bit binary present state codes 0000–1111. The states are also arranged in an even/odd parity pattern which indicates that consecutive states assumed by the state array machine are only allowed by transitioning from an odd parity state to an even parity state, or from an even parity state to an odd parity state.

FIG. 4 also shows that sequentially adjacent state codes relate so that only one of the four different bits can change from one state to the next state. This state array transition relationship or characteristic also exists in the state array diagram shown in FIG. 3. The relationship that consecutively adjacent states assumed by the state array machine only differ by one bit is herein termed unit distance coding for purposes of this document. Unit distance coding is preferred in controllers constructed according to this invention.

The state diagram of FIG. 4 utilizes bit-specific transition variables 3,2,1,0 for defining the alternative branchings which can occur during transition from one state array machine present state to the next state array machine state. In this scheme the branching or transition instruction includes a change in one of the four binary bits used to define the present state code. The bits are designated by the numbers 3,2,1,0 with 3 representing the most significant bit and 0 the least significant bit. A change in bit 3, the left hand bit, requires assertion of a transition instruction 3 together with a transition command, either $T_e$ or $T_o$ depending on whether transition is occurring from an even state or odd state, respectively. The state array branching conditions are shown in FIG. 4 as arrows with the appropriate Boolean expressions, such as $2\cdot T_e$, based on a bit-specific transition instruction issued from the transition instructor 40 which is ANDed with transition command signals, $T_e$ or $T_o$.

The holding conditions in the state array machine 60a for even parity states is $\overline{T}_e + \overline{3}\cdot\overline{2}\cdot\overline{1}\cdot\overline{0} = 1$, and for odd parity states is $\overline{T}_o + \overline{3}\cdot\overline{2}\cdot\overline{1}\cdot\overline{0} = 1$. Even parity state outputs from the state array machine include the present state code given in binary form $y_3y_2y_1y_0$; the even and odd timing control initiation signals $S_e$ and $S_o$; and the Reset signal. The $S_e$ signal is asserted only if $\overline{T}_o\cdot(3+2+1+0)\cdot EP$ is true. The $S_o$ signal is asserted only if $\overline{T}_e\cdot(3+2+1+0)\cdot OP$ is true. The Reset signal is asserted if $\overline{3}\cdot\overline{2}\cdot\overline{1}\cdot\overline{0}$ is true.

The state array diagrams of FIGS. 3 and 4 further indicate that both state array transitioning schemes chosen in these embodiments allow transitions in all branching directions or dimensions from any state. The arrays represented by FIGS. 3 and 4 are thus conceptually continuous and can be visualized as effectively toroidal to wrap around to the opposite side of the array from either the top, bottom, left side or right side of the array as shown in the Figs. This relationship is shown by the transition arrows at the margin of the arrays which connect to their adjacent states at the opposite edges of the arrays, thus indicating that theses states can be assumed consecutively as the state array machine transitions from state to state.

The various present state codes are assumed by the state array machines one at a time, thus defining the present state of the state array machine. The state code output from programmable logic arrays (PLAs) 65 and 65a are functions of the inputs 66 and 66a which include the present state code variables, $y_3, y_2, y_1, y_0$; transition command signals $T_e$ or $T_o$; and transition variables (U,D,L,R or 0,1,2,3).

PLAs 65 and 65a also advantageously include input connections for system reset (SYS-RES) and enable (EN). It is the function of the SYS-RES input to initialize the MAC module into a specific state. The EN input permits one mac module to be bit-sliced (cascaded) with another MAC module to form a larger state array machine having a greater number of possible states. A programming table setting forth input and output combinations for PLA 65 is presented in Table I for the embodiment of FIGS. 11A and 11B, and for PLA 65a in Table II for the embodiment of FIGS. 12A and 12B.

FIGS. 7 and 8 shown a generalized state diagram for even parity and odd parity states, respectively, which may be assumed by a state array machine portion of a controller (not shown) but similar to controller 30a described above. The state array machine states are uniquely identified by the preferred binary state code in the form of output signals $y_{n-1} \ldots y_2 y_1 y_0$.

The generalized odd parity state shown in FIG. 7 can be branched into by satisfying a desired in-branching condition by asserting any transition variable n−1, ... 2,1, or 0 issued from the transition instructor together with assertion of the even transition command signal, $T_e$, from the timing control machine. The odd parity states can thus be entered using any of n number of in-branching alternatives (n-way in-branching).

The generalized odd parity state can be branched from to other states which are assumable by the state array machine. Conditions for out-branching require assertion of one of the transition variables n−1, ... 2,1,0 from the transition instructor, together with assertion of the odd transition command signal, $T_o$, from the timing control machine. This provides n-way out-branching.

The odd parity state is held or maintained by satisfying the Boolean expression $\overline{T_o} + (\overline{n-1} \ldots \overline{2} \cdot \overline{1} \cdot \overline{0}) = 1$. This occurs when the odd transition command signal $T_o$ is not asserted or when none of the transition instruction variables are asserted.

The odd parity state of FIG. 7 further has associated outputs from the state array machine which assert the odd timing control initiation signal $S_o$ conditionally if $T_e \cdot [(n-1) + \ldots 2 + 1 + 0)] = 1$. This occurs when the even transition command signal, $T_e$, is not asserted by the timing control machine and at least one of the transition instruction signals is asserted by the transition instruction. The output from the state array machine in an odd parity state further asserts Reset if and when the expression $(\overline{n-1}) \ldots \overline{2} \cdot \overline{1} \cdot \overline{0} = 1$ is true. The Reset output signal is thus asserted if none of the transition instruction signals from the transition instructor are asserted.

The even parity state shown in FIG. 8 can be branched into by satisfying any of the defined in-branching conditions which include asserting any transition variable n−1, ... 2,1, or 0 from the transition instructor, together with assertion of the odd transition command signal, $T_o$, from the timing control machine. The even parity state can thus be entered using any of n number of in-branching alternatives (n-way in-branching).

The even parity state can be branched from to other states which are assumable by the state array machine. Conditions for out-branching require assertion of one of the transition variables n−1, ... 2,1,0 from the transition instructor together with assertion of the even transition command signal, $T_e$, from the timing control machine. This provides n-way out-branching from the even parity state.

The even parity state is held or maintained by satisfying the Boolean expression $\overline{T_e} + (\overline{n-1} \ldots \overline{2} \cdot \overline{1} \cdot \overline{0}) = 1$. This occurs when the even transition command signal, $T_e$, is not asserted or when none of the transition instruction variables are asserted.

The even parity state of FIG. 8 further has associated outputs from the state array machine which assert the even timing control initiation signal, $S_e$, conditionally if $\overline{T_o} \cdot [(n-1) + \ldots 2 + 1 + 0)] = 1$. This occurs when the odd transition command signal, $T_o$, is not asserted by the timing control machine and at least one of the transition instruction signals is asserted by the transition instructor. The output from the state array machine in an even parity state, as in an odd state, further asserts the Reset signal if and when the expression $(\overline{n-1}) \ldots \overline{2} \cdot \overline{1} \cdot \overline{0} = 1$ is true. The Reset output signal is thus asserted if none of the transition instruction signals from the transition instructor are asserted.

The generalized state array machine state diagrams of FIGS. 7 and 8 help to define a class of controllers (not otherwise shown) which can be constructed similar to controller 30a, which utilize any desired number of bit-specific transition variables. Programming for the state array portion of the control module of such a controller would be different than the programming described in Table II, but similar in concept. Such a state array machine can be utilized with a timing control machine similar to timing control machine 70.

In general a state array machine according to this invention can have various number of potential states which can advantageously be visualized as dimensions m by p which gives a total number of states equal to m times p (m × p). The associated state code format must be sufficient to allow encoding of such number of states.

The MAC modules 50 and 50a can be embodied in a wide variety of electronic forms depending on the model that is used and the hardware that is chosen for implementation. The logic circuits in FIGS. 11A, 11B, 12A and 12B have been designed by using the nested machine form of the fundamental mode model. Thus, the system inputs 41 to the controller 30 must be constrained to change one-at-a-time to ensure that only one transition instruction input is active at any given time. If the pulse mode model is applied to the design of the MAC module 50, then the system inputs 41 to the controller 30 must be non-overlapping pulses.

Figure 12A:
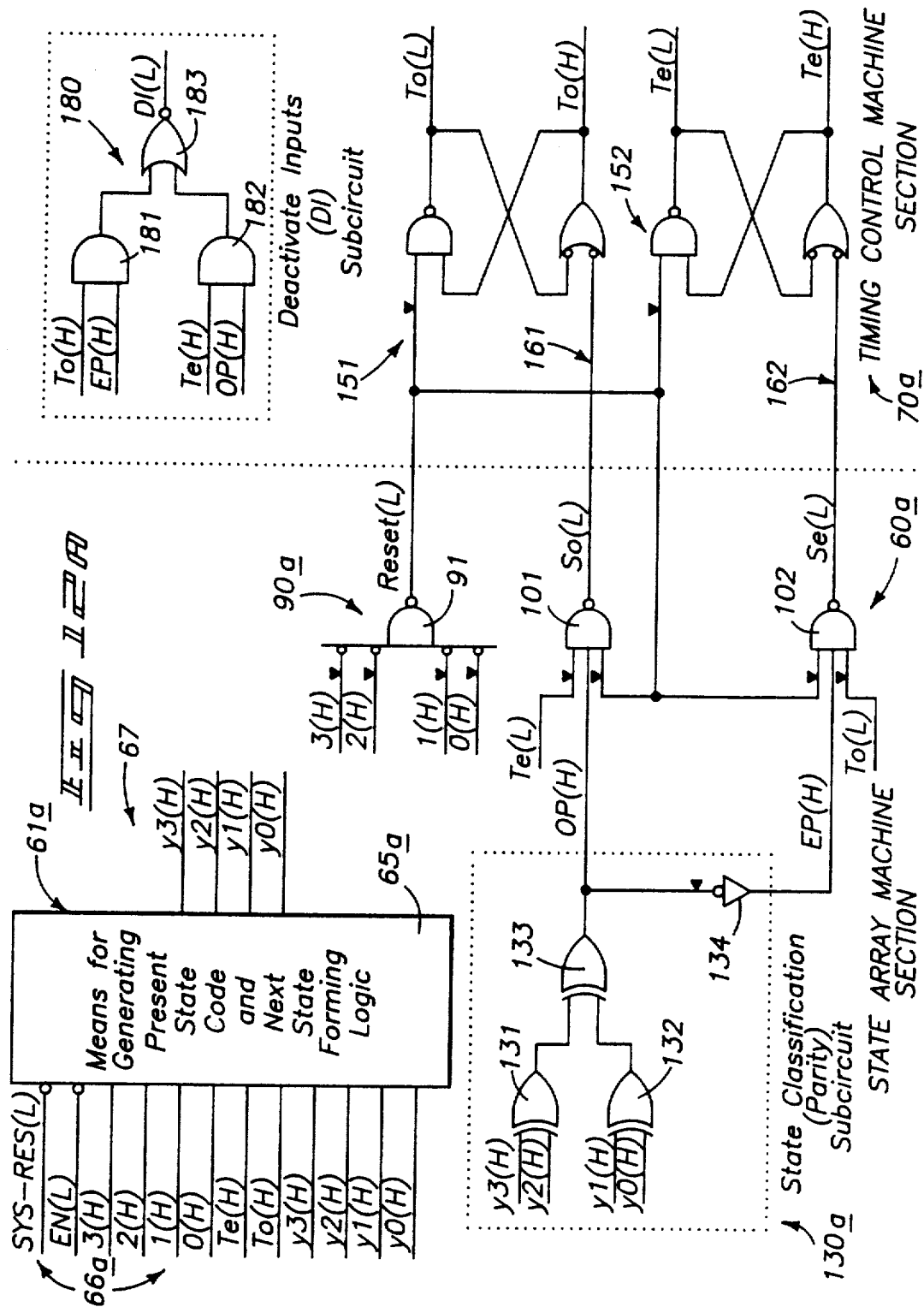
FIG. 12A is a logic diagram showing a preferred form of MAC module used in the controller of FIG. 2. The diagram shows both state array and timing control machine portions which utilize the bit-specific transition variable inputs to assume the states as indicated in the state diagrams of FIGS. 4 and 9, respectively. The diagram is presented in the mixed rail form of notation.

The activation level indicator symbol (L) used in FIGS. 11A and 12A, signifies active low and implies negative logic while the activation level indicator symbol (H) signifies active high and implies positive logic. The flag symbol ▼ indicates input logic level incompatibility which, in turn, is responsible for complementation of the flagged input variable in the gate output expression. An example of logic level incompatibility would be an active low input to a gate that requires an active high input (no bubble). In FIGS. 11A and 12A the bubble is an active low indicator symbol wherever it appears.

Figure 11B:
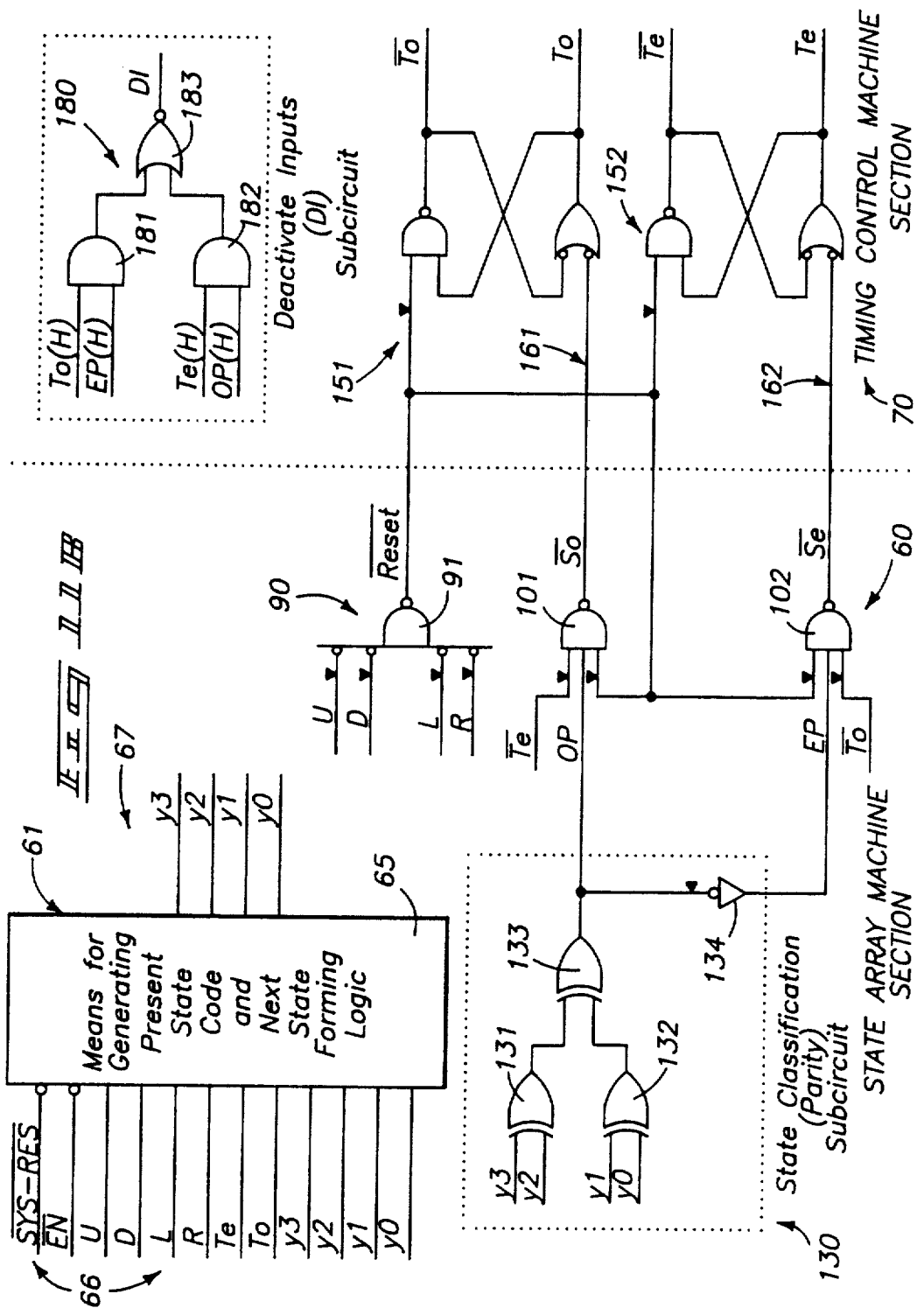
FIG. 11B is a logic diagram the same as FIG. 11A except it is presented primarily in positive logic notation.
Figure 12B:
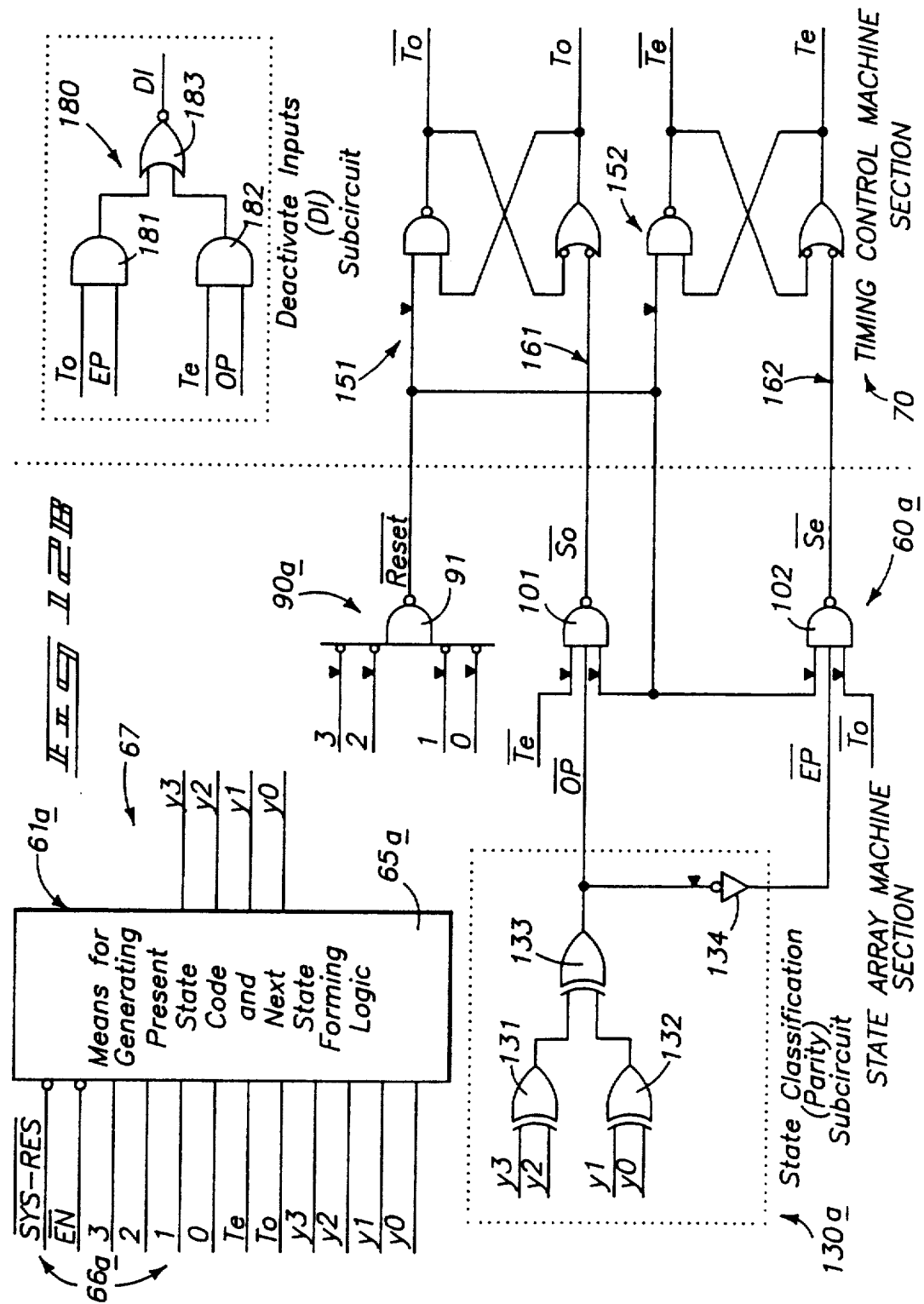
FIG. 12B is a logic diagram the same as FIG. 12A except it is presented primarily in positive logic notation.

FIGS. 11B and 12B utilize positive logic representations of FIGS. 11A and 12A, respectively. All active low inputs and active low outputs which appear in FIGS. 11A and 12A with the symbol (L) are complemented (overbarred) in FIGS. 11B and 12B, and all active high inputs and outputs which appear in FIGS. 11A and 12A with the symbol (H) are left uncomplemented (no overbar). The two pairs of circuit diagrams, those represented in mixed-logic (FIGS. 11A and 12A) and those represented in partial positive logic form (FIGS. 11B and 12B), are provided for the sake of clarity.

Refer now to FIGS. 11A, 11B, 12A and 12B for a complete description of preferred logic structures used to implement the MAC modules 50 and 50a. The state array machines 60 and 60a can also be defined to include reset subcircuits 90 and 90a which are advantageously implemented in the form of an OR gate 91 (performing the AND operation) which has inputs including all of the transition instruction variables produced by the transition instructor 40. The Reset signal from OR gate 91 is $\overline{U} \cdot \overline{D} \cdot \overline{L} \cdot \overline{R} \cdot (L)$ or $\overline{3} \cdot \overline{2} \cdot \overline{1} \cdot \overline{0}(L)$ which satisfies the conditional Reset output in FIGS. 3 and 4, respectively. Thus, any assertion of a transition variable (U, D, L, R or 0, 1, 2, 3) causes the output of OR gate 91 to be deactivated.

The output signal from the reset subcircuits 90 or 90a also provide an output which is input to NAND gates 101 and 102 which, in turn, have outputs $\overline{T}_3 \cdot (U+D+L+R) \cdot OP$ and $\overline{T}_o \cdot (U+D+L+R) \cdot EP$ that satisfy the conditional outputs for $S_o$ and $S_e$ in FIG. 3, respectively; and $\overline{T}_e \cdot (3+2+1+0) \cdot OP$ and $\overline{T}_o \cdot (3+2+1+0) \cdot EP$ for $S_o$ and $S_e$ in FIG. 4, respectively. NAND gates 101 and 102 function as a means for assuring that any previous transitions have occurred prior to proceeding with issuing of the timing control initiation signals $S_o$ and $S_e$. NAND gates 101 and 102 also function to provide independent even and odd timing control initiation signals, $S_e$ and $S_o$, for the even and odd parity classes, respectively.

NAND gates 101 and 102 are controlled in part by a classification or parity subcircuit 130 which produces complementary even and odd parity signals EP and OP, respectively. The present state code is input to parity subcircuit 130 using the four output signals $y_3, y_2, y_1, y_0$ which represent the present state of state array machines 60 or 60a. EXCLUSIVE OR (XOR) gates 131 and 132 each receive two of the present state code signals and each provide a high output only if one of the inputs is high. The outputs of XOR gates 131 and 132 are fed to XOR gate 133 which provides a high output only if odd parity exists. If an even parity state exists, then XOR gate 133 has a low output which is inverted by inverter 134 to provide a high asserted even parity signal, EP. The output from XOR gate 133 is input to NAND gate 101 and the output from inverter 134 is input to NAND gate 102. Parity subcircuit 130 can more generally be considered a state code classification circuit and could have more than two classes with associated discrete class output signals which would be input to suitable NAND gates or other timing control initiation signal generating subcircuits for each classification channel.

NAND gate 101 receives the odd parity signal, OP(H), as an input along with the Reset (L) signal and the complement of the even transition command signal, $\overline{T}_e$ or $T_e(L)$. This provides an asserted low output signal, $\overline{S}_o$ or $S_o(L)$, from NAND gate 101 only when: the parity of the present state is odd; the MAC module has not just transitioned from an even parity state $(T_e(L)=0(L)=1(H))$; and the Reset(L) signal is not asserted, Reset(L)=0(L)=1(H), thus indicating that one of the transition instruction inputs has been activated.

NAND gate 102 receives the even parity signal as an input along with the Reset(L) signal and the complement of the odd transition command signal, $\overline{T}_o$ or $T_o(L)$. This provides an asserted low output signal, $\overline{S}_e$ or $S_e(L)$, from NAND gate 102 only when: the parity of the present state is even; the MAC module has not just transitioned from an odd state $(T_o(L)=0(L)=1(H))$; and the Reset(L) signal is not asserted, (Reset(L)=0(L)=1(H), thus indicating that one of the transition instruction inputs has been activated.

The output from NAND gate 101 is communicated to the odd parity channel 161 of a timing control machine 70. NAND gate 101 produces an odd timing control initiation signal, $\overline{S}_o$ or $(S_o(L))$, which is the input to the S(L) input of SR latch 151 or other suitable bistable latch device. Latch 151 provides the odd transition command signal, $T_o$, which is asserted high and communicated to the associated state array machine 60 or 60a thus triggering the state array machine to transition from an odd parity present state code to a new present state which is of even parity, in accordance with the asserted transition instruction using transition variable signals (U, D, L, R pr 3, 2, 1, 0). There is preferably only one asserted transition variable at a time thus providing unit distance coded transitions consecutively in time.

The output from NAND gate 102 is communicated to the even channel 162 of timing control machine 70. NAND gate 102 produced an even timing control initiation signal, $\overline{S}_e$ or $(S_e(L))$, which is the input to the S(L) input of SR latch 152 or other suitable bistable latch device. Latch 152 provides an even transition command signal, $T_3$, which is asserted high and communicated to the associated state array machine 60 or 60a thus triggering the state array machine to transition from an even parity present state to a new present state which is of odd parity, in accordance with the asserted transition variable.

The control modules 50 and 50a each also include a deactivate input (DI) signal generating subcircuit 180. The DI subcircuit includes even and odd parity AND gates 181 and 182, respectively. The inputs to AND gate 181 include the odd transition command signal, $T_o$, from latch 151, and the even parity output signal, EP, from inverter 134. The inputs to AND gate 182 include the even transition command signal, $T_e$, from latch 152 and the odd parity output signal, OP, from XOR gate 133. The outputs from AND gates 181 and 182 are input to a NOR gate 183 which produces an inactive output when both AND gates 181 and 182 have low outputs. A high output from either of AND gates 181 or 182 will provide a low output from NOR gate 183 thus asserting the DI signal. AND gate 181 will go high to assert the DI signal upon change of the state array machine to an even parity state while the $T_o$ signal is high. This occurs immediately after transition from an odd parity state. The DI signal will remain asserted until the output from the timing control machine at $T_o$ goes low after the Reset signal has been asserted as a result of deactivation of the transition variables by the asserted DI output.

Similarly, the output from AND gate 182 will only go high to assert the DI signal upon change to an odd parity state while the $T_e$ signal is high. This occurs immediately after transition from an even parity state. The DI signal will remain asserted until the output from the timing control machine at $T_e$ goes low as a result of deactivation of the transition variables by the asserted DI signal.

The DI signal produced by DI subcircuit 180 is communicated to the transition instruction machine 40 (see FIG. 1) to advantageously provide that no transition instruction variable (U, D, L, R, or 3, 2, 1, 0) be asserted until after the reset subcircuit 90 has been allowed to reset the timing control machine latches 151 and 152. This assures an orderly transition between consecutive unit distance coded states and prevents certain timing defects from occurring.

The reset subcircuits 90 and 90a, the subcircuits of timing control machine 70, transition assurance subcircuits 101 and 102 can advantageously perform as a transition control means which detects the issuance of a transition instruction and assures that previous transitions have been completed prior to any further transitions. The DI subcircuit 180 and parity subcircuits 130 and 130a also contribute to the process of controlling transition from one state to another within the MAC Module 50. The transition control means preferably includes distinct channels for each class of state codes such as for the even and odd parity classes. Where additional classes are used, additional parallel channels can be incorporated into the multichannel transition control means similar to NAND gate 101 and latch 151, and NAND gate 102 and latch 152.

The above description has provided an explanation of the structural components, connections and subcircuits used in controllers 30 and 30a along with subcircuit operation. Also included has been a development of the operational states of the controllers from the Boolean and state diagram viewpoint. A more complete operational and methodological description will now be made based on the preferred logic circuitry employed. This description will first consider the process which occurs in controller 30 in transitioning from an even parity state to an odd parity state. Thereafter, a description will be given for the converse situation from an odd parity state to an even parity state. Operation of controller 30a is substantially the same.

Controller 30 will normally remain in a stable state for a given set of system inputs once steady state has been achieved through assumption of the proper state code. A change in system input variables 41 may cause transition instructor 40 to provide outputs signals in the form of transition instructions to state array machine 60. More specifically, FIG. 3 shows at the top left hand corner the state 0000 which is an even parity classification. It is preferably for the state array machine to transition from this even parity state into one of four different odd parity states. By transitioning up (U) along the U·$T_e$ arrow the transition wraps around and state 1000 is achieved because of the continuous nature of the state array. By transitioning down (D) along the D·$T_e$ arrow, the state 0100 is achieved. By transitioning right along the R·$T_e$ arrow, the 0001 state is assumed, and by transitioning left along the L·$T_e$ arrow, the 0010 state is assumed.

FIG. 13 shows a timing diagram for transition from the 0000 state to the 0100 state. The timing diagram of FIG. 13 is in mixed logic notation. In such notation an asserted (active) signal is a logical 1 and shown relatively higher in the timing diagram irrespective of its activation level indicator, (H or L). An unasserted (inactive) signal is a logical 0 and shown relatively lower in the timing diagram, also irrespective of its activation level indicator (H or L).

FIG. 13 begins with the SYS-RES(L) signal asserted which causes the direction specific inputs U,D,L, and R to all be in unasserted conditions, U(H)=D(H)=L(H)=R(H)=0(H). The active SYS-RES(L) signal forces the state array machine 60 into a 0000 initialization state ($y_3=y_2=y_1=y_0=0$), and the timing control machine into a 0,0 initialization state ($T_e=T_o=0$). These initialization states are indicated just prior to time t=10 nanoseconds (ns). At t=10 ns the SYS-RES(L) signal is deactivated and the controller is freed to operate.

The first action occurs at t=20 ns when the D(H) signal is asserted by transition instructor 40. The asserted D(H) signal, D(H)=1(H), causes the reset subcircuit 90 in FIG. 11A to become inactive, Reset(L)=0(L)=1(H). The deactivation Reset(L) output signal is communicated to NAND gates 101 and 102. NAND gate 102 only produces an output, $S_e$(L)=1(L), if the timing control signal $T_o$(L) is not asserted ($T_o$(L)=0(L)=1(H)); the present state is even (EP(H)=1(H)); and the Reset(L) signal is deasserted (Reset(L)=0(L)=1(H)). If a prior transition to the even state is still in progress then the $T_o$(L) signal would be asserted ($T_o$(L)=1(L)=0(H)) and gate 102 would not be satisfied. However, $T_o$(L) is not asserted as shown in FIG. 13 so $T_o$(L)=0(L)=1(H). NAND gate 102 is further satisfied because state 0000 is even parity and the parity subcircuit 130 produces OP(H)=0(H) and EP(H)=1(H). These signals combined with the deactivated Reset, Reset (L)=0(L)=1(H), produce an asserted even timing control initiation signal, $S_e$(L)=1(L). The asserted $S_e$(L) signal causes the timing control machine even latch 152 to become set and assert an even timing control signal $T_e$(H)=1(H). This places timing control machine 70 into the 01 state as indicated in FIG. 9.

The asserted even timing control signal $T_e$(H)=1(H) is communicated to the next state forming logic in state array machine 60. The state array machine processes the $T_e$(H)=1(H) signal and produces a change in $y_2$(H) state code signal from 0(H) to 1(H). This changes the state code from 0000 to 0100 thus completing transition in the state array machine.

The change in state code to 0100 is communicated to the classification (parity) subcircuit 130 which causes XOR gate 131 to assert an output which in turn causes XOR gate 133 to assert with OP(H)=1(H). This causes the even parity signal to become inactive EP(H)=0(H). The deactivation of the even parity signal causes even channel NAND gate 102 to deactivate, $S_e$(L)=0(L).

The change in parity is also communicated to the DI subcircuit 180. Since the odd parity signal is asserted (OP(H)=1(H)) and the even timing control signal is asserted ($T_e$(H)=1(H)), AND gate 182 produces an asserted output (1(H)) which is input to NOR gate 183 to cause the DI signal to assert (DI(L)=1(L)).

The asserted DI(L) signal is communicated to the transition instructor 40 and thus causes the down transition instruction, D(H), to be deactivated (D(H)=0(H)). This in turn causes the reset subcircuit OR gate 91 to be asserted, Reset (L)=1(L)=0(H). Assertion of the Reset (L) signal causes the timing control latch 152 to be reset thus causing the even transition control signal to be deactivated, $T_e$(H)=0(H). Deactivation of the $T_e$(H) signal causes the output of the DI subcircuit to also be deactivated, D(L)=0(L). Deactivation of the DI subcircuit allows the transition instructor to once again issue any desired transition instructions.

Figure 14A:
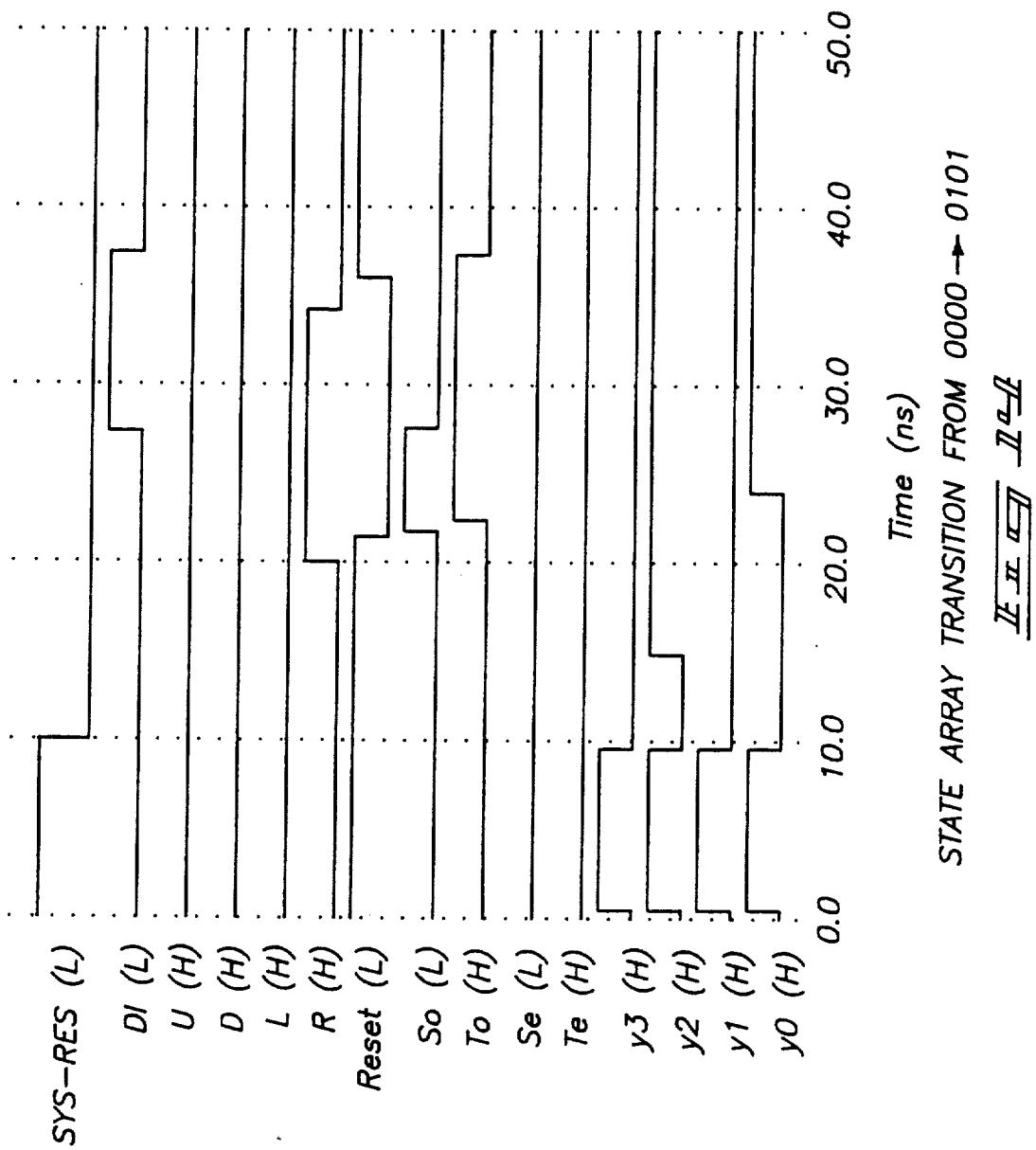
FIG. 14 is a timing diagram showing various signals generated in a computer-generated operational simulation of the MAC module of FIGS. 1, 1A, 11A and 11B. The timing diagram depicts a transition from the odd parity state 0100 to the even parity state 0101.

FIG. 14 shows another timing diagram similar to FIG. 13 except it shows transition from an odd parity state 0100 to an even parity state 0101. The timing diagram of FIG. 14 uses the same notation as explained above with respect to FIG. 13.

FIG. 14 also begins with the SYS-RES(L) signal asserted with causes the directions specific inputs U,D,L and R to all be in the unasserted conditions, U(H)=0(H)=L(H)=R(H)=0(H). The active SYS-RES(L) signal forces the state array machine 60 into a 0000 initialization state just prior to time t=10 ns. The timing control machine 70 is also initialized into a 00 state at time t=10 ns. A time t=15 ns the y2 state code variable is changed to 1 in order to set up the proper state code 0100. At time t=20 ns the R(H) signal is asserted by transition instructor 40.

The asserted R(H) signal, R(H)=1(H) causes the reset subcircuit 90 to become inactive, Reset(L)=0(L)=1(H). The deactivated Reset(L) output signal is communicated to NAND gates 101 and 102. NAND gate 101 only produces an output $S_o(L)=1(L)$ if the timing control signal $T_e(L)$ is not asserted $(T_e(L)=0(L)=1(H))$; the present state is odd (OP(H)=1(H)); and the Reset(L) signal is deasserted (Reset(L)=0(L)=1(H)). If a prior transition to the odd state is still in progress then the $T_e(L)$ signal would be asserted $(T_e(L)=1(L)=0(H))$ and gate 101 would not be satisfied. However, $T_e$ is not asserted as shown in FIG. 14 so $T_e(L)=0(L)=1(H)$. NAND gate 101 is further satisfied because state 0100 is odd parity and the parity subcircuit 130 produces OP(H)=1(H). These signals combined with the deactivated Reset, Reset (L)=0(H)=1(H), produce an asserted odd timing control initiation signal, $S_o(L)=1(L)$. The asserted $S_o(L)$ signal causes the timing control machine odd latch 151 to become set and assert an odd timing control signal $T_o(H)=1(H)$. This places timing control machine 70 into the 10 state as indicated in FIG. 9.

The asserted odd timing control signal $T_o(H)=1(H)$ is communicated to the next state forming logic in state array machine 60. The state array machine processes the $T_o(H)=1(H)$ signal and produces a change in $y_0(H)$ state code signal from 0(H) to 1(H). This changes the state code from 0100 to 0101 thus completing transition in the state array machine.

The change in state code to 0101 is communicated to the classification (parity) subcircuit 130 which causes XOR gate 132 to assert an output. Since XOR gate 131 is already asserted, this causes XOR gate 133 to deassert. This causes the odd parity signal to become inactive OP(H)=0(H). The deactivation of the odd parity signal causes odd channel NAND gate 101 to deactivate, $S_o(L)=0(L)$.

The change in parity also is communicated to the DI subcircuit 180. Since the even parity signal is asserted (EP(H)=1(H)) and the odd timing control signal is asserted ($T_o(H)=1(H)$), and gate 181 produces an asserted output (1(H)) which is input to NOR gate 183 to cause the DI signal to assert DI(L)=1(L).

The asserted DI(L) signal is communicated to the transition instructor 40 and thus causes the asserted right transition instruction, R(H)=1(H), to be deactivated (R(H)=0(H)). This in turn causes the reset subcircuit OR gate 91 to be asserted, Reset (L)=1(L)=0(H). Assertion of the Reset (L) signal causes the timing control latch 152 to be reset thus causing the odd transition control signal to be deactivated, $T_o(H)=0(H)$. Deactivation of the $T_o$ signal causes the output of the DI subcircuit to also be deactivated, DI(L)=0(L). Deactivation of the DI subcircuit allows the transition instructor to once again issue any desired transition instruction.

Controller 30 allows 16 distinct state to be used. Alternative forms of controllers according to this invention can use different numbers of states and different state array codes, such as by adding or subtracting bits to or from the state code. Where a binary state code in the form $y_{n-1}\ldots y_2 y_1 y_0$ is used, then $2^n$ states are possible by the state array machine. The controllers can also be constructed and programmed to provide alternative numbers of branching directions. In general, using more branching alternatives causes more complex state relationships to exist and the requirement for transitioning between states of different classes will become more difficult to describe graphically. The preferred form of controllers are programmed to provide unit distance coding for each set of sequentially adjacent states which the controller can assume. The exact programming needed to implement these transition processes will necessarily vary depending on the state code scheme, the number of transition variables used in the transition instructions, the number of states in the array, and the types and numbers of transitions which can be made from each different state.

Table I below sets out the state array machine programming used in the 4×4—16 state scheme described above with respect to controller 30. Table I presents a preferred form of control module programming which was developed using two-level minimization and is designed for PLA 65. Table I is presented in positive logic form with the understanding that the SYS-RES input is deactivated (SYS-RES=1) as indicated in the table, and that the direction-specific inputs to the next state forming logic are enabled (EN=1) which is not shown. The variables $y_0$, $y_1$, $y_2$ and $y_3$) on the left are the present state variables, and the Y-variables ($Y_3$, $Y_2$, $Y_1$ and $Y_0$) on the right are the next state variables whose values are the result of function optimization. In the left hand portion of the table, inputs to the product terms (p-terms) are specified as low (logic 0), high (logic 1), or not connected (−). The PLA outputs, on the right side of the table, are marked to either include the defined p-term (1), or not to include the p-term (0). The first 55 terms defined in the table are the basic logic, while the last 16 are redundant terms required to guarantee static hazard-free operation.

TABLE I

| RE-SET | U | D | L | R | Te | To | y0 | y1 | y2 | y3 | Y3 | Y2 | Y1 | Y0 |
|---|---|---|---|---|---|---|---|---|---|---|---|---|---|---|
| 1 | — | — | — | — | — | 0 | 0 | 0 | 0 | 1 | 1 | 0 | 0 | 0 |
| 1 | — | 0 | — | — | — | — | — | — | 0 | 1 | 1 | 0 | 0 | 0 |
| 1 | — | — | — | — | — | 0 | 0 | 0 | 1 | 0 | 0 | 1 | 0 | 0 |
| 1 | 0 | — | — | — | — | — | — | — | 1 | 0 | 0 | 1 | 0 | 0 |
| 1 | 0 | — | — | — | — | — | — | — | 1 | 1 | 1 | 0 | 0 | 0 |
| 1 | — | 0 | — | — | — | — | — | — | 1 | 1 | 0 | 1 | 0 | 0 |
| 1 | — | — | — | — | 0 | — | 0 | 0 | 1 | 1 | 1 | 1 | 0 | 0 |
| 1 | — | — | — | — | — | 0 | 0 | 1 | 0 | 0 | 0 | 0 | 1 | 0 |
| 1 | — | — | — | 0 | — | — | 0 | 1 | — | — | 0 | 0 | 1 | 0 |
| 1 | — | — | — | — | 0 | — | 0 | 1 | 0 | 1 | 1 | 0 | 1 | 0 |
| 1 | — | — | — | — | 0 | — | 0 | 1 | 1 | 0 | 0 | 1 | 1 | 0 |
| 1 | — | — | — | — | — | 0 | 0 | 1 | 1 | 1 | 1 | 1 | 1 | 0 |
| 1 | — | — | 0 | — | — | — | 1 | 0 | — | — | 0 | 0 | 0 | 1 |
| 1 | — | — | — | — | — | 0 | 1 | 0 | 0 | 0 | 0 | 0 | 0 | 1 |
| 1 | — | — | — | — | 0 | — | 1 | 0 | 0 | 1 | 1 | 0 | 0 | 1 |
| 1 | — | — | — | — | 0 | — | 1 | 0 | 1 | 0 | 0 | 1 | 0 | 1 |
| 1 | — | — | — | — | — | 0 | 1 | 0 | 1 | 1 | 1 | 1 | 0 | 1 |
| 1 | — | — | — | 0 | — | — | 1 | 1 | — | — | 0 | 0 | 0 | 1 |
| 1 | — | — | 0 | — | — | — | 1 | 1 | — | — | 0 | 0 | 1 | 0 |
| 1 | — | — | — | — | 0 | — | 1 | 1 | 0 | 0 | 0 | 0 | 1 | 1 |
| 1 | — | — | — | — | — | 0 | 1 | 1 | 0 | 1 | 1 | 0 | 1 | 1 |
| 1 | — | — | — | — | — | 0 | 1 | 1 | 1 | 0 | 0 | 1 | 1 | 1 |
| 1 | — | — | — | — | 0 | — | 1 | 1 | 1 | 1 | 1 | 1 | 1 | 1 |
| 1 | — | — | — | 1 | — | 1 | 0 | 0 | 0 | 1 | 0 | 0 | 0 | 1 |
| 1 | — | — | — | 1 | — | 1 | 1 | 0 | 0 | 0 | 0 | 0 | 1 | 0 |
| 1 | — | — | — | 1 | — | 1 | 1 | 0 | 1 | 1 | 0 | 0 | 1 | 0 |

TABLE I-continued

| RESET | U | D | L | R | Te | To | y0 | y1 | y2 | y3 | Y3 | Y2 | Y1 | Y0 |
|---|---|---|---|---|---|---|---|---|---|---|---|---|---|---|
| 1 | — | — | — | — | 1 | 1 | — | 0 | 0 | 0 | 0 | 0 | 0 | 1 |
| 1 | — | — | — | — | 1 | 1 | — | 0 | 0 | 1 | 1 | 0 | 0 | 0 | 1 |
| 1 | — | — | — | — | 1 | 1 | — | 1 | 0 | 0 | 1 | 0 | 0 | 1 | 0 |
| 1 | — | — | — | — | 1 | 1 | — | 1 | 0 | 1 | 0 | 0 | 0 | 1 | 0 |
| 1 | — | — | — | 1 | — | — | 1 | 0 | 0 | 0 | 1 | 0 | 0 | 1 | 0 |
| 1 | — | — | — | 1 | — | — | 1 | 0 | 0 | 1 | 0 | 0 | 0 | 1 | 0 |
| 1 | — | — | — | 1 | — | — | 1 | 0 | 1 | 0 | 0 | 0 | 0 | 0 | 1 |
| 1 | — | — | — | 1 | — | — | 1 | 0 | 1 | 1 | 1 | 0 | 0 | 0 | 1 |
| 1 | — | — | — | 1 | — | 1 | — | 0 | 0 | 0 | 0 | 0 | 0 | 1 | 0 |
| 1 | — | — | — | 1 | — | 1 | — | 0 | 0 | 1 | 1 | 0 | 0 | 1 | 0 |
| 1 | — | — | — | 1 | — | 1 | — | 0 | 1 | 0 | 0 | 0 | 0 | 0 | 1 |
| 1 | — | — | — | 1 | — | 1 | — | 0 | 1 | 1 | 0 | 0 | 0 | 0 | 1 |
| 1 | — | 1 | — | — | — | — | 1 | 0 | 0 | 1 | 0 | 1 | 0 | 0 | 0 |
| 1 | — | 1 | — | — | — | — | 1 | 0 | 1 | 0 | 0 | 0 | 1 | 0 | 0 |
| 1 | — | 1 | — | — | — | 1 | 1 | 1 | 0 | 0 | 0 | 0 | 1 | 0 | 0 |
| 1 | — | 1 | — | — | — | 1 | 1 | 1 | 1 | 0 | 1 | 0 | 1 | 0 | 0 |
| 1 | — | 1 | — | — | 1 | — | 0 | 0 | 0 | 0 | 0 | 1 | 0 | 0 |
| 1 | — | 1 | — | — | 1 | — | 0 | 1 | 1 | 0 | 1 | 0 | 1 | 0 | 0 |
| 1 | — | 1 | — | — | 1 | — | 1 | 0 | 1 | 0 | 1 | 0 | 1 | 0 | 0 |
| 1 | — | 1 | — | — | 1 | — | 1 | 1 | 0 | 0 | 0 | 1 | 0 | 0 |
| 1 | 1 | — | — | — | — | 1 | 0 | 0 | 0 | 1 | 0 | 1 | 0 | 0 |
| 1 | 1 | — | — | — | — | 1 | 0 | 1 | 0 | 0 | 1 | 0 | 0 | 0 |
| 1 | 1 | — | — | — | — | 1 | 1 | 0 | 0 | 0 | 1 | 0 | 0 | 0 |
| 1 | 1 | — | — | — | — | 1 | 1 | 1 | 0 | 1 | 0 | 1 | 0 | 0 |
| 1 | 1 | — | — | — | 1 | — | 0 | 0 | 0 | 0 | 1 | 0 | 0 | 0 |
| 1 | 1 | — | — | — | 1 | — | 0 | 0 | 1 | 0 | 1 | 0 | 0 | 0 |
| 1 | 1 | — | — | — | 1 | — | 1 | 0 | 0 | 1 | 0 | 1 | 0 | 0 |
| 1 | 1 | — | — | — | 1 | — | 1 | 1 | 0 | 0 | 1 | 0 | 0 | 0 |
| 1 | 0 | — | — | — | — | 0 | 0 | 0 | 0 | — | 1 | 1 | 0 | 0 | 0 |
| 1 | 0 | — | — | — | 0 | — | 0 | 1 | 0 | — | 1 | 1 | 0 | 0 | 0 |
| 1 | 0 | — | — | — | 0 | — | 0 | 1 | — | 1 | 1 | 0 | 0 | 0 |
| 1 | 0 | — | — | — | 0 | 1 | 1 | — | 1 | 1 | 0 | 0 | 0 |
| 1 | — | 0 | — | — | — | 0 | 0 | 0 | 1 | — | 0 | 1 | 0 | 0 |
| 1 | — | 0 | — | — | 0 | — | 1 | 0 | 1 | — | 0 | 1 | 0 | 0 |
| 1 | — | 0 | — | — | 0 | — | 0 | 1 | 1 | — | 0 | 1 | 0 | 0 |
| 1 | — | 0 | — | — | 0 | 1 | 1 | 1 | — | 0 | 1 | 0 | 0 |
| 1 | — | — | 0 | — | — | 0 | — | 1 | 0 | 0 | 0 | 0 | 1 | 0 |
| 1 | — | — | 0 | — | 0 | — | — | 1 | 1 | 0 | 0 | 0 | 1 | 0 |
| 1 | — | — | 0 | — | 0 | — | 1 | 0 | 1 | 0 | 0 | 0 | 1 | 0 |
| 1 | — | — | 0 | — | 0 | — | 1 | 1 | 1 | 0 | 0 | 0 | 1 | 0 |
| 1 | — | — | — | 0 | — | 0 | 1 | — | 0 | 0 | 0 | 0 | 0 | 1 |
| 1 | — | — | — | 0 | 0 | — | 1 | — | 1 | 0 | 0 | 0 | 0 | 1 |
| 1 | — | — | — | 0 | 0 | — | 1 | — | 0 | 1 | 0 | 0 | 0 | 1 |
| 1 | — | — | — | 0 | — | 0 | 1 | — | 1 | 1 | 0 | 0 | 0 | 1 |

Table II below shows another preferred form of control module programming used in PLA 65a where the bit oriented transition variables 0, 1, 2 and 3 are used instead of U, D, L and R. No redundant terms are necessary for hazard-free operation in the bit-oriented version for which Table II presents programming.

TABLE II

| RESET | 3 | 2 | 1 | 0 | Te | To | y0 | y1 | y2 | y3 | Y3 | Y2 | Y1 | Y0 |
|---|---|---|---|---|---|---|---|---|---|---|---|---|---|---|
| 1 | 0 | — | — | — | — | — | — | — | — | 1 | 1 | 0 | 0 | 0 |
| 1 | — | — | — | — | — | 0 | 0 | 0 | 0 | 1 | 1 | 0 | 0 | 0 |
| 1 | — | 0 | — | — | — | — | — | — | 1 | — | 0 | 1 | 0 | 0 |
| 1 | — | — | — | — | — | 0 | 0 | 0 | 1 | 0 | 0 | 1 | 0 | 0 |
| 1 | — | — | — | 0 | — | 0 | 0 | 1 | 1 | 1 | 1 | 0 | 0 |
| 1 | — | — | 0 | — | — | — | — | 1 | — | — | 0 | 0 | 1 | 0 |
| 1 | — | — | — | — | — | 0 | 0 | 1 | 0 | 0 | 0 | 1 | 0 |
| 1 | — | — | — | — | 0 | — | 0 | 1 | 0 | 1 | 1 | 0 | 1 | 0 |
| 1 | — | — | — | — | 0 | — | 0 | 1 | 1 | 0 | 0 | 1 | 1 | 0 |
| 1 | — | — | — | — | — | 0 | 0 | 1 | 1 | 1 | 1 | 1 | 1 | 0 |
| 1 | — | — | — | 0 | — | — | 1 | — | — | — | 0 | 0 | 0 | 1 |
| 1 | — | — | — | — | — | 0 | 1 | 0 | 0 | 0 | 0 | 0 | 0 | 1 |
| 1 | — | — | — | — | 0 | — | 1 | 0 | 0 | 1 | 1 | 0 | 0 | 1 |
| 1 | — | — | — | — | 0 | — | 1 | 0 | 1 | 0 | 1 | 0 | 0 | 1 |
| 1 | — | — | — | — | 0 | — | 1 | 0 | 1 | 1 | 1 | 1 | 0 | 1 |
| 1 | — | — | — | — | 0 | — | 1 | 1 | 0 | 0 | 0 | 0 | 1 | 1 |
| 1 | — | — | — | — | — | 0 | 1 | 1 | 0 | 1 | 1 | 0 | 1 | 1 |
| 1 | — | — | — | — | 0 | — | 1 | 1 | 1 | 0 | 1 | 1 | 1 | 1 |
| 1 | — | — | 1 | — | 1 | 0 | 0 | 0 | 1 | 0 | 0 | 0 | 1 |
| 1 | — | — | 1 | — | 1 | 0 | 0 | 1 | 0 | 0 | 0 | 0 | 1 |
| 1 | — | — | 1 | — | 1 | 0 | 1 | 0 | 0 | 0 | 0 | 0 | 1 |

TABLE II-continued

| RESET | 3 | 2 | 1 | 0 | Te | To | y0 | y1 | y2 | y3 | Y3 | Y2 | Y1 | Y0 |
|---|---|---|---|---|---|---|---|---|---|---|---|---|---|---|
| 1 | — | — | — | 1 | — | 1 | 0 | 1 | 1 | 1 | 0 | 0 | 0 | 1 |
| 1 | — | — | — | 1 | 1 | — | 0 | 0 | 0 | 0 | 0 | 0 | 0 | 1 |
| 1 | — | — | — | 1 | 1 | — | 0 | 0 | 1 | 1 | 0 | 0 | 0 | 1 |
| 1 | — | — | — | 1 | 1 | — | 0 | 1 | 0 | 1 | 0 | 0 | 0 | 1 |
| 1 | — | — | — | 1 | 1 | — | 0 | 1 | 1 | 0 | 0 | 0 | 0 | 1 |
| 1 | — | — | 1 | — | — | 1 | 0 | 0 | 0 | 1 | 0 | 0 | 1 | 0 |
| 1 | — | — | 1 | — | — | 1 | 0 | 0 | 1 | 0 | 0 | 0 | 1 | 0 |
| 1 | — | — | 1 | — | 1 | — | 1 | 0 | 0 | 0 | 0 | 0 | 1 | 0 |
| 1 | — | — | 1 | — | 1 | — | 1 | 0 | 1 | 1 | 0 | 0 | 1 | 0 |
| 1 | — | — | 1 | — | — | 1 | 0 | 0 | 0 | 0 | 0 | 1 | 0 |
| 1 | — | — | 1 | — | 1 | — | 0 | 0 | 1 | 1 | 0 | 0 | 1 | 0 |
| 1 | — | — | 1 | — | — | 1 | 0 | 0 | 1 | 0 | 0 | 1 | 0 |
| 1 | — | — | 1 | — | 1 | — | 1 | 0 | 0 | 0 | 0 | 1 | 0 |
| 1 | — | 1 | — | — | — | 1 | 0 | 0 | 0 | 1 | 0 | 1 | 0 | 0 |
| 1 | — | 1 | — | — | — | 1 | 0 | 1 | 0 | 0 | 0 | 1 | 0 | 0 |
| 1 | — | 1 | — | — | — | 1 | 1 | 0 | 0 | 0 | 1 | 0 | 0 |
| 1 | — | 1 | — | — | — | 1 | 1 | 0 | 1 | 0 | 1 | 0 | 1 | 0 | 0 |
| 1 | — | 1 | — | — | 1 | — | 0 | 0 | 0 | 0 | 0 | 1 | 0 | 0 |
| 1 | — | 1 | — | — | 1 | — | 0 | 1 | 0 | 1 | 0 | 1 | 0 | 0 |
| 1 | — | 1 | — | — | 1 | — | 1 | 0 | 1 | 0 | 1 | 0 | 1 | 0 | 0 |
| 1 | — | 1 | — | — | 1 | — | 1 | 1 | 0 | 0 | 0 | 1 | 0 | 0 |
| 1 | 1 | — | — | — | — | 1 | 0 | 0 | 1 | 0 | 1 | 0 | 0 | 0 |
| 1 | 1 | — | — | — | — | 1 | 0 | 1 | 0 | 1 | 0 | 0 | 0 |
| 1 | 1 | — | — | — | — | 1 | 1 | 0 | 0 | 1 | 0 | 0 | 0 |
| 1 | 1 | — | — | — | — | 1 | 1 | 1 | 0 | 1 | 0 | 0 | 0 |
| 1 | 1 | — | — | — | 1 | — | 0 | 0 | 0 | 1 | 1 | 0 | 0 | 0 |
| 1 | 1 | — | — | — | 1 | — | 0 | 1 | 1 | 0 | 1 | 0 | 0 | 0 |
| 1 | 1 | — | — | — | 1 | — | 1 | 0 | 1 | 0 | 1 | 0 | 0 | 0 |
| 1 | 1 | — | — | — | 1 | — | 1 | 1 | 0 | 0 | 1 | 0 | 0 | 0 |

It is further noteworthy that a preferred form of the invention contemplates that one or more of control modules 50 or 50a can be constructed on a first integrated circuit chip (IC) and the programming and hardware for transition instructor 40 can be constructed on a second IC chip. Since the specific controller microcode programming can be implemented on the second IC chip this will allow the controller to be reprogrammed merely by unplugging the second chip and replacing it with alternative controller microcode programming or by using a reprogrammable transition instructor device such as an EPROM. The control module programming such as set out in Tables I and II will only change if the basic module configuration is changed. Thus the invention includes programmable controller systems by using the basic control modules as explained herein. Accordingly, the control modules can be manufactured in mass and used as an asynchronous controller with any desired digital system merely by customizing the controller microcode programming to fill the particular needs of the user's system such as by using a customized PLA, ROM or functionally equivalent electronic structure.

Since the basic control modules 50 and 50a described herein contain only 16 states, they are limited in the number of applications for which they can be used. To overcome this problem, the control module has been constructed to allow connection of 2 or more modules in a cascaded or bit-sliced arrangement. Specifically, the enable connection has been included on the module to facilitate such bit-slicing. Since signals in a cascaded system will all operate in parallel, the speed of the module will not be compromised when it is used in a bit-sliced configuration. Large systems designed by using numerous modules will operate just as fast as systems designed with a single module. Two different methods for bit-slicing the module are presented below.

FIG. 15 shows a controller 300 having first and second MAC modules 350 and 351, respectively, which are both similar to control module 50 as shown in FIGS. 1, 1A, 11A and 11B with transition variables U, D, L and R. Controllers using cascaded modules with bit-specific variables are also equally possible. Controller 300 includes a transition instructor 340 which is advantageously a programmable logic array which has been properly programmed with the controller microcode programming specific to the particular system requirements. Control module 350 is connected to receive transition instructions using transition variable signals $U_o$, $D_o$, $L_o$, and $R_o$ similar to U, D, L and R discussed above, from the transition instructor. Control module 351 is similarly connected to receive transition instructions using transition variable signals $U_1$, $D_1$, $L_1$, and $R_1$, also similar to U, D, L and R.

Modules 350 produces four state code output variables $y_3$, $y_2$, $y_1$, $y_0$ and a $DI_0$ signal. Module 351 produces four additional state code output variables $y_7$, $y_6$, $y_5$ and $y_4$ and a $DI_1$ signal. The combined outputs from modules 350 and 351 thus allow $16 \times 16$ or 256 different states to be assumed which are advantageously presented or encoded as an eight bit binary representation in the form $y_7y_6y_5y_4y_3y_2y_1y_0$, such as 10010100. The present state code output signals are input to the transition instructor 340 which also receives system inputs 341 and produces system outputs 342 in a manner analogous to controller 30 discussed above.

Two DI inputs, $DI_0$ and $DI_1$ to the transition instructor 340 are needed because of the basically independent operation of each module. Immediately following the completion of a state transition involving change in a state variable $y_7$, $y_6$, $y_5$ or $y_4$, the $DI_1$ output of MAC module 351 goes active while the DI output of MAC module 350 remains inactive. Similarly, immediately following the completion of a state transition involving a change in a state variable $y_3$, $y_2$, $y_1$ or $y_0$, the $DI_0$ output of MAC module 350 goes active while that of MAC module 351 remains inactive.

The cascaded approach used in controller 300 provides enablement via an asserted EN signal to both modules 350 and 351 at all times. Only one of the eight different transition instruction variables is asserted at any particular time. The control module programming shown in Table I can accordingly be used for each module. The controller microcode programming will necessarily differ from that presented below in Tables III and IV because of the greater numbers of inputs and outputs from the transition instructor and the generally different system being controlled. Appropriate digital design minimization techniques can be used for the particular system requirements in order to minimize the number of p-terms and size of PLA or other device used for transition instructor 340.

Figure 16:
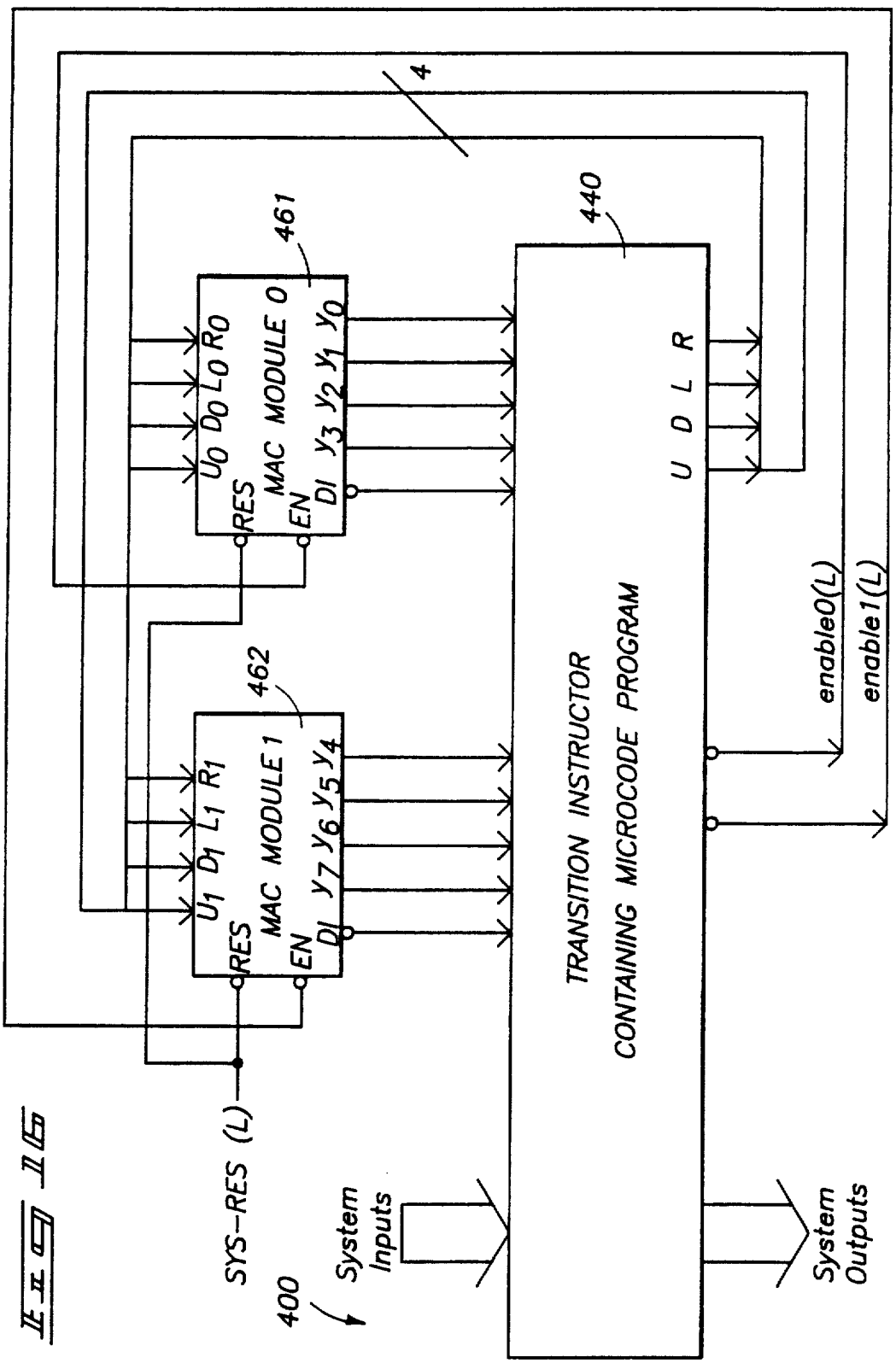
FIG. 16 is a block diagram showing a further alternative controller according to this invention. The controller also utilizes two MAC modules which are cascaded in an alternative manner from that shown in FIG. 15.

FIG. 16 shows an alternative bit-sliced or cascaded controller 400 which also uses two control modules 461 and 462 which are similar in construction and programming to control module 50 described hereinabove. Controller 400 includes a transition instructor 440 which is advantageously a PLA of suitable size. The output from PLA 440 includes four transition variables U, D, L and R which provide for transitions as described above. Each module receives the same U, D, L and R signals. However, two distinct enable signals enable 0 and enable 1 provide appropriate activation of either first module 461 or second module 462, respectively, as needed to provide transition in the state code variables $y_7 - y_4$ or $y_3 - y_0$, respectively. Thus, the number of outputs needed from PLA 440 increases by only one for each extra enable signal for each additional module in the system. This is different from the arrangement of FIG. 15 which requires additional transition variables for each module.

One precaution which must be followed in using the arrangement of FIG. 16 is that when the machine is stable and the potential next states of the machine could require a transition in one of two or more modules, all of the enable signals should be disabled to prevent erroneous transitions. As an example, suppose that a module is enabled and the system receives an input which indicates that a transition is to take place in a different module. This would generate a critical timing path between the transition instruction and enable signals. If the transition instruction signal were to activate before the enable could become valid, the previously enabled module would receive a short pulse on the transition instruction input, and it could change state when it was not supposed to. One drawback of this method of bit-slicing is that it adds a large number of extra p-terms to the PLA since the transition instruction signals must include DI inputs and the enable signals must be independent of them.

Either method of bit-slicing will effectively generate a larger capacity controller. Controllers 300 and 400 each provide 256 different possible combinations for the present state being assumed by the state array machine portions. They each also provide for branching in any one of eight different ways, for example $U_1$, $D_1$, $L_1$, $R_1$, $U_o$, $D_o$, $L_o$, $R_o$. The alternation between parity classes is still maintained along with unit distance coding.

In general the bit-sliced MAC modules need not be cascaded using state array machines with the same type of state array. For example, a $2 \times 2$ MAC module can be bit-sliced with a $4 \times 4$ MAC module to produce one of $2^2 \times 4^2 = 64$ state capacity with six state variables and up to six-way branching capacity. In general, preferred versions of the MAC module having state array machines of dimensions $(2^m \times 2^n)$, $(2^p \times 2^q)$, ..., can be bit-sliced to produce a system state capacity of $2^m \times 2^n \times 2^p \times 2^q \ldots$ with up to $[m+n+p+q+\ldots]$-way branching capacity, where m, n, p, and q are any desired integer values.

EXAMPLE 1

An asynchronous traffic light control system based on controller 30 was designed and simulated. The traffic light control system is described in the following problem statement:

> The controller is required to operate a traffic light at the intersection of a main highway and a less-frequently-used farm road. Traffic sensors will be placed on both the highway and the farm road to tell the system when traffic is present. As long as no traffic is present on the farm road, the traffic on the highway will be allowed to flow. When a vehicle activates the sensor on the farm road, the signal will switch immediately if the traffic sensor on the highway is not active. Otherwise, the vehicle on the farm road must wait for 30 seconds or until the highway is clear, whichever occurs first. Once the vehicle has gone, the system is to switch the signal to once again allow traffic flow on the highway.

In designing the controller, it was assumed that two interval timers were available, one for the 30 second interval and the other for a 5 second period during which the traffic light is yellow. The exact nature of these timers is not important except that they each accept an input to signal the start of the interval and return an output to indicate when the specified time has elapsed. Upon receiving the input signal, the timer will reset the interval and begin timing. At the end of the specified time, the output signal activates and remains active until the input signal deactivates.

Figure 17:
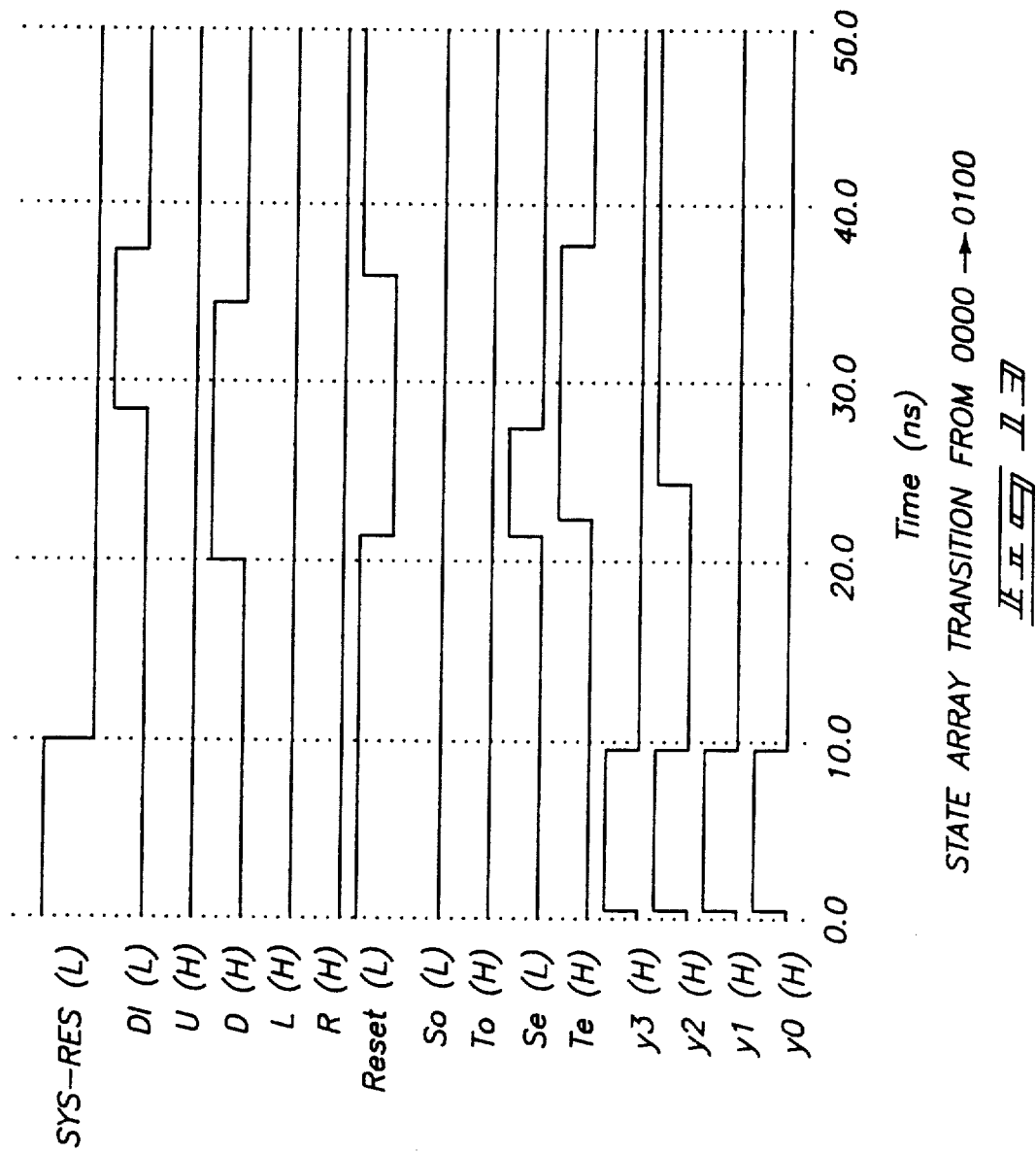
FIG. 17 is a state diagram for a traffic light controller described in Example 1.

A state diagram for the traffic light controller is shown in FIG. 17. In designing this state diagram, the basic rules for asynchronous design have been observed. For example, the machine branches from state-a (0000) to state-b (0001) when the farm sensor is activated and then moves on to state-c (0011) or state-d (0101) depending on the status of the highway sensor, rather than branching directly to state-c or state-d. This eliminates the undesirable structure of a branch to two different states which depends upon a change in more than one state code variable and maintains unit distance coding. In addition, a GO/NO-GO configuration has been followed as much as possible to ensure that erroneous transitions will not occur. Unit distance coding also requires the insertion of the fly state at state-c. The outputs assigned to state-c were chosen to maintain the hazard-free nature of the outputs and at the same time reduce the complexity of the output logic. The control module programming and controller microcode programming were mapped and reduced to the PLA programming table shown in Table III below. The PLA for programming this machine was designed and the entire machine was then simulated.

grated on the same IC as the module, the proper hold times would have to be provided.

EXAMPLE 2

Sequence Recognizer

The digitally controlled machine to be developed in this example receives two inputs, X and Y, and issues a single output, SEQ_VALID. The machine detects changes on the two input signals and determines if the sequence of these changes matches the predefined pattern XYXYYXYY, and activates the SEQ_VALID output if they do match. The machine will monitor the sequence when both X and Y are inactive for the first time, or when they both become inactive after an incorrect previous sequence.

Figure 18:
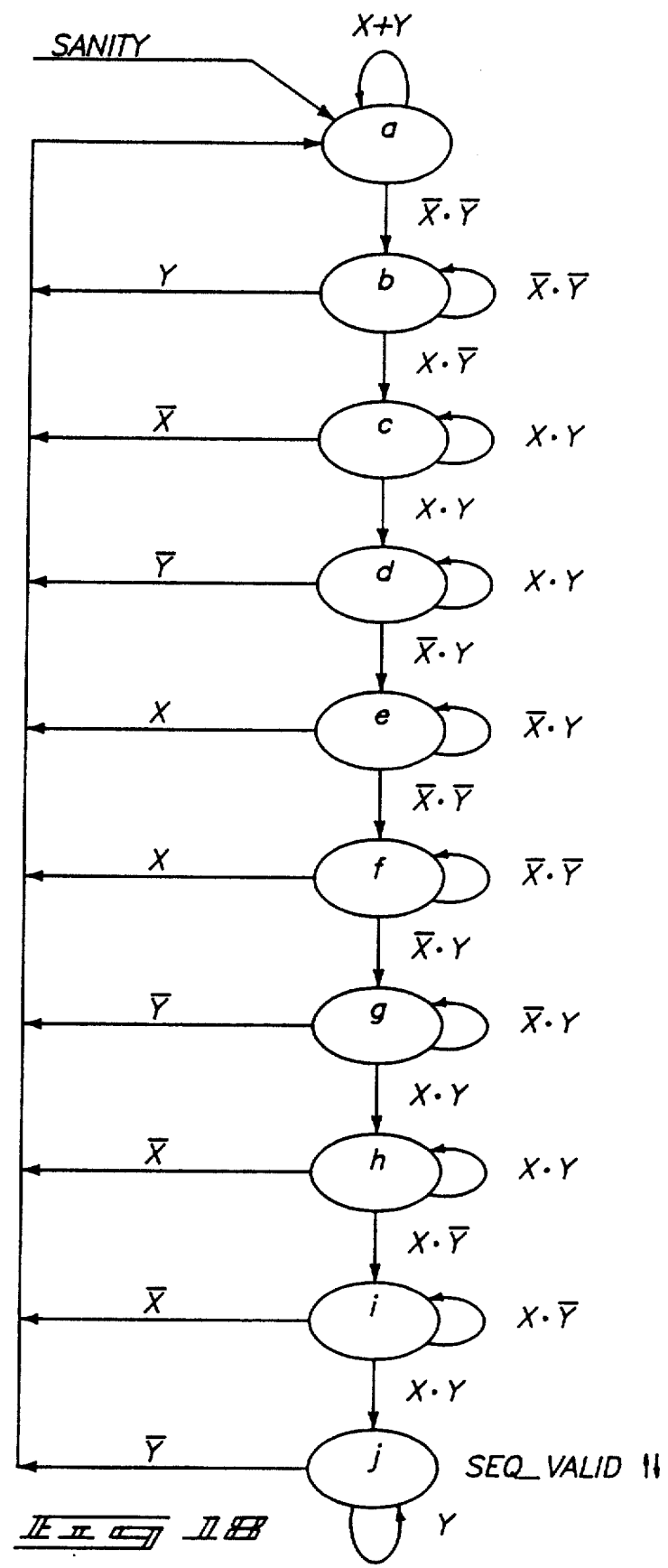
FIG. 18 is a state diagram for a sequence recognizer described in Example 2.

The basic state diagram for this system is shown in FIG. 18. This is the diagram which an engineer would develop independent of the hardware to be used in building the device. It gives a complete representation of the machine in a format which can easily be expanded to accommodate the chosen hardware.

Figure 19:
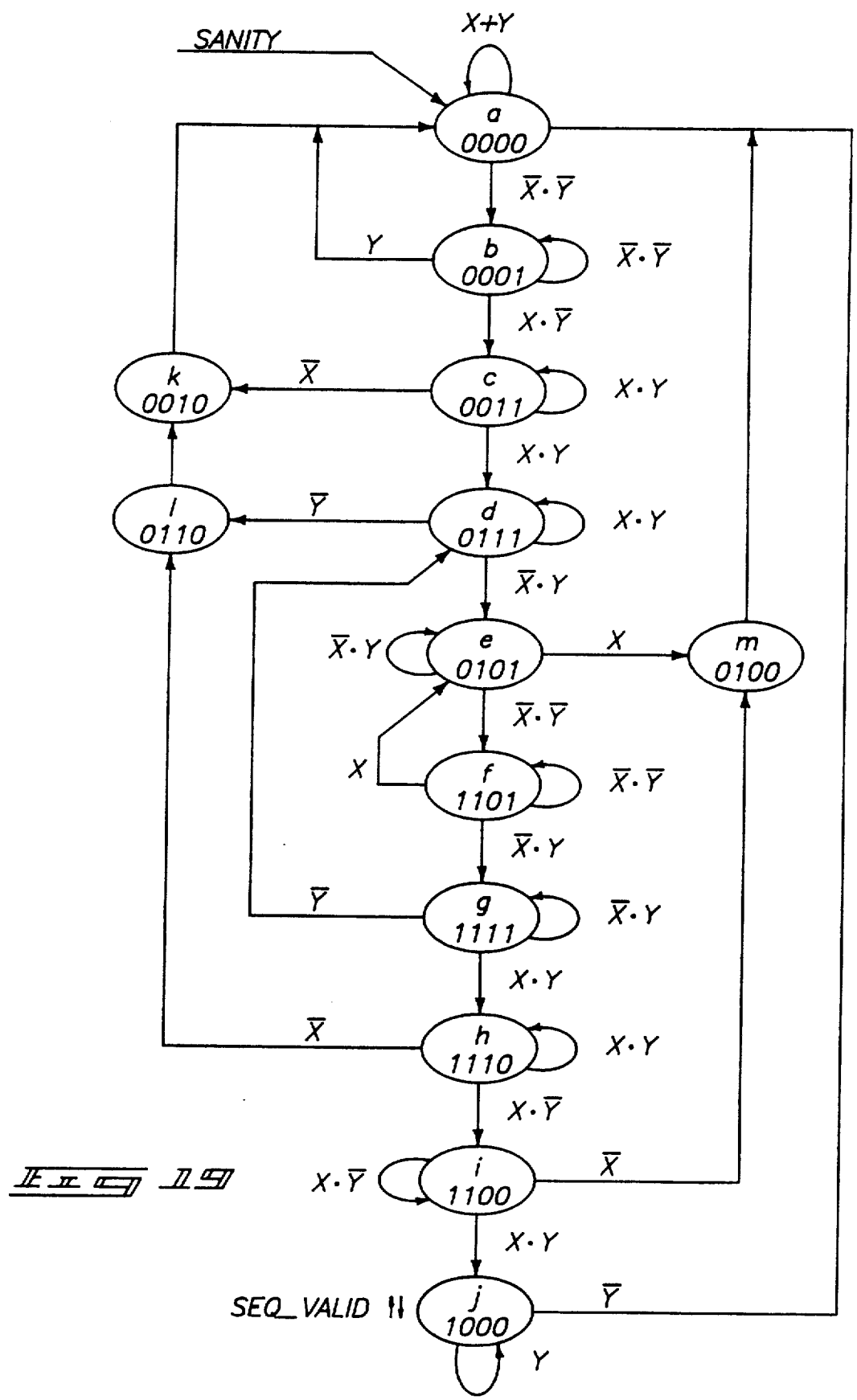
FIG. 19 is a state diagram derived from the diagram of FIG. 18 adapted for use with a controller according to this invention as described in Example 2.

FIG. 19 shows the same state diagram after it has been modified for implementation with a preferred controller according to this invention. The states have all been unit distance coded. Fly states have been introduced to maintain unit distance coding. The transitions from state-g to state-d and from state-f to state-e have been used instead of using extra fly states, since doing so will not adversely affect the machine's operation.

Table IV shows ROM programming tables for two different module configurations. One configuration uses

TABLE III

| P-term | U | D | R | Farm Red | Farm Ylw | Farm Grn | Hway Red | Hway Ylw | Hway Grn | Start 30 | Start 5 |
|---|---|---|---|---|---|---|---|---|---|---|---|
| $y_2 \cdot \bar{y}_0 \cdot \overline{Farm} \cdot DI$ | 1 | 0 | 0 | 0 | 0 | 0 | 0 | 0 | 0 | 0 | 0 |
| $\bar{y}_2 \cdot y_0 \cdot Hway \cdot DI$ | 0 | 1 | 0 | 0 | 0 | 0 | 0 | 0 | 0 | 0 | 0 |
| $\bar{y}_2 \cdot y_1 \cdot y_0 \cdot DI$ | 0 | 1 | 0 | 0 | 0 | 0 | 0 | 0 | 0 | 0 | 0 |
| $\bar{y}_2 \cdot \bar{y}_1 \cdot \bar{y}_0 \cdot Farm \cdot DI$ | 0 | 0 | 1 | 0 | 0 | 0 | 0 | 0 | 0 | 0 | 0 |
| $\bar{y}_1 \cdot y_0 \cdot \overline{Hway} \cdot DI$ | 0 | 0 | 1 | 0 | 0 | 0 | 0 | 0 | 0 | 0 | 0 |
| $y_2 \cdot \bar{y}_1 \cdot y_0 \cdot 30\ sec\ DI$ | 0 | 0 | 1 | 0 | 0 | 0 | 0 | 0 | 0 | 0 | 0 |
| $y_2 \cdot y_1 \cdot y_0 \cdot 5\ sec\ DI$ | 0 | 0 | 1 | 0 | 0 | 0 | 0 | 0 | 0 | 0 | 0 |
| $\bar{y}_2 \cdot y_1 \cdot \bar{y}_0 \cdot 5\ sec\ DI$ | 0 | 0 | 1 | 0 | 0 | 0 | 0 | 0 | 0 | 0 | 0 |
| $y_0$ | 0 | 0 | 0 | 1 | 0 | 0 | 0 | 0 | 0 | 0 | 0 |
| $\bar{y}_2 \cdot \bar{y}_1$ | 0 | 0 | 0 | 1 | 0 | 0 | 0 | 1 | 0 | 0 | 0 |
| $\bar{y}_2 \cdot y_1 \cdot \bar{y}_0$ | 0 | 0 | 0 | 0 | 1 | 0 | 0 | 0 | 0 | 0 | 1 |
| $y_2 \cdot y_1 \cdot \bar{y}_0$ | 0 | 0 | 0 | 0 | 0 | 1 | 0 | 0 | 0 | 0 | 0 |
| $y_2 \cdot \bar{y}_1 \cdot y_0$ | 0 | 0 | 0 | 0 | 0 | 0 | 0 | 0 | 1 | 0 | 0 |
| $y_1 \cdot \bar{y}_0$ | 0 | 0 | 0 | 0 | 0 | 0 | 1 | 0 | 0 | 0 | 0 |
| $y_1 \cdot y_0$ | 0 | 0 | 0 | 0 | 0 | 0 | 0 | 1 | 0 | 0 | 0 |
| $\bar{y}_1 \cdot y_0$ | 0 | 0 | 0 | 0 | 0 | 0 | 0 | 0 | 1 | 0 | 0 |
| $y_2 \cdot y_1 \cdot y_0$ | 0 | 0 | 0 | 0 | 0 | 0 | 0 | 0 | 0 | 0 | 1 |

Note:
Since the L (left) input is always low, It is not included in the PLA programming table.

In this simulation, the machine worked properly and moved through the state diagram in the proper sequence. Since the controller microcode PLA was placed on the same IC, some delay was added to the outputs thereof to ensure that sufficient hold time would be provided. This is not likely to be required in an actual system since the time required for the outputs of the module to propagate from the module, to a discrete IC used for the controller microcode PLA is most likely longer than the internal feedback delay. However, if the controller microcode PLA were to be intea single 4×4 state array version of the module as described hereinabove. The second configuration uses two 2×2 modules in a bit-sliced configuration analogous to that described hereinabove for two 4×4 modules and described with respect to FIG. 15. In the second configuration, module A (inputs $A_1$ and $A_0$) generates the most significant two bits of the state code, and module B (inputs $B_1$ and $B_0$) generates the least significant two bits.

TABLE IV

| TRANSITION INSTRUCTOR INPUTS | | | | | | CONTROL MODULE OUTPUTS | | | | | CASCADED OUTPUT FOR TWO CONTROL MODULES | | | | |
|---|---|---|---|---|---|---|---|---|---|---|---|---|---|---|---|
| $\overline{DI}$ | X | Y | $y_3$ | $y_2$ | $y_1$ | $y_0$ | U | D | L | R | SEQ_VALID | $A_1$ | $A_0$ | $B_1$ | $B_0$ | SEQ_VALID |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 1 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 | 0 |
| 0 | 0 | 0 | 0 | 1 | 0 | 1 | 0 | 0 | 0 | 0 | 0 | 0 | 0 | 0 | 0 | 0 |
| 0 | 0 | 0 | 0 | 1 | 1 | 0 | 0 | 0 | 0 | 0 | 0 | 0 | 0 | 0 | 0 | 0 |
| 0 | 0 | 0 | 0 | 1 | 1 | 1 | 0 | 0 | 0 | 0 | 0 | 0 | 0 | 0 | 0 | 0 |
| 0 | 0 | 0 | 1 | 0 | 0 | 0 | 0 | 0 | 0 | 0 | 1 | 0 | 0 | 0 | 0 | 1 |
| 0 | 0 | 0 | 1 | 0 | 0 | 1 | 0 | 0 | 0 | 0 | 0 | 0 | 0 | 0 | 0 | 0 — * |
| 0 | 0 | 0 | 1 | 0 | 1 | 0 | 0 | 0 | 0 | 0 | 0 | 0 | 0 | 0 | 0 | 0 — * |
| 0 | 0 | 0 | 1 | 0 | 1 | 1 | 0 | 0 | 0 | 0 | 0 | 0 | 0 | 0 | 0 | 0 — * |
| 0 | 0 | 0 | 1 | 1 | 0 | 0 | 0 | 0 | 0 | 0 | 0 | 0 | 0 | 0 | 0 | 0 |
| 0 | 0 | 0 | 1 | 1 | 0 | 1 | 0 | 0 | 0 | 0 | 0 | 0 | 0 | 0 | 0 | 0 |
| 0 | 0 | 0 | 1 | 1 | 1 | 0 | 0 | 0 | 0 | 0 | 0 | 0 | 0 | 0 | 0 | 0 |
| 0 | 0 | 0 | 1 | 1 | 1 | 1 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 0 | 0 |
| 0 | 0 | 1 | 0 | 0 | 0 | 1 | 0 | 0 | 0 | 0 | 0 | 0 | 0 | 0 | 0 | 0 |
| 0 | 0 | 1 | 0 | 0 | 1 | 0 | 0 | 0 | 0 | 0 | 0 | 0 | 0 | 0 | 0 | 0 |
| 0 | 0 | 1 | 0 | 0 | 1 | 1 | 0 | 0 | 0 | 0 | 0 | 0 | 0 | 0 | 0 | 0 |
| 0 | 0 | 1 | 0 | 1 | 0 | 0 | 0 | 0 | 0 | 0 | 0 | 0 | 0 | 0 | 0 | 0 |
| 0 | 0 | 1 | 0 | 1 | 0 | 1 | 0 | 0 | 0 | 0 | 0 | 0 | 0 | 0 | 0 | 0 |
| 0 | 0 | 1 | 0 | 1 | 1 | 0 | 0 | 0 | 0 | 0 | 0 | 0 | 0 | 0 | 0 | 0 |
| 0 | 0 | 1 | 0 | 1 | 1 | 1 | 0 | 0 | 0 | 0 | 0 | 0 | 0 | 0 | 0 | 0 |
| 0 | 0 | 1 | 1 | 0 | 0 | 0 | 0 | 0 | 0 | 0 | 1 | 0 | 0 | 0 | 0 | 1 |
| 0 | 0 | 1 | 1 | 0 | 0 | 1 | 0 | 0 | 0 | 0 | 0 | 0 | 0 | 0 | 0 | 0 — * |
| 0 | 0 | 1 | 1 | 0 | 1 | 0 | 0 | 0 | 0 | 0 | 0 | 0 | 0 | 0 | 0 | 0 — * |
| 0 | 0 | 1 | 1 | 0 | 1 | 1 | 0 | 0 | 0 | 0 | 0 | 0 | 0 | 0 | 0 | 0 — * |
| 0 | 0 | 1 | 1 | 1 | 0 | 0 | 0 | 0 | 0 | 0 | 0 | 0 | 0 | 0 | 0 | 0 |
| 0 | 0 | 1 | 1 | 1 | 0 | 1 | 0 | 0 | 0 | 0 | 0 | 0 | 0 | 0 | 0 | 0 |
| 0 | 0 | 1 | 1 | 1 | 1 | 0 | 0 | 0 | 0 | 0 | 0 | 0 | 0 | 0 | 0 | 0 |
| 0 | 0 | 1 | 1 | 1 | 1 | 1 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 | 0 |
| 0 | 1 | 0 | 0 | 0 | 0 | 1 | 0 | 0 | 0 | 0 | 0 | 0 | 0 | 0 | 0 | 0 |
| 0 | 1 | 0 | 0 | 0 | 1 | 0 | 0 | 0 | 0 | 0 | 0 | 0 | 0 | 0 | 0 | 0 |
| 0 | 1 | 0 | 0 | 0 | 1 | 1 | 0 | 0 | 0 | 0 | 0 | 0 | 0 | 0 | 0 | 0 |
| 0 | 1 | 0 | 0 | 1 | 0 | 0 | 0 | 0 | 0 | 0 | 0 | 0 | 0 | 0 | 0 | 0 |
| 0 | 1 | 0 | 0 | 1 | 0 | 1 | 0 | 0 | 0 | 0 | 0 | 0 | 0 | 0 | 0 | 0 |
| 0 | 1 | 0 | 0 | 1 | 1 | 0 | 0 | 0 | 0 | 0 | 0 | 0 | 0 | 0 | 0 | 0 |
| 0 | 1 | 0 | 0 | 1 | 1 | 1 | 0 | 0 | 0 | 0 | 0 | 0 | 0 | 0 | 0 | 0 |
| 0 | 1 | 0 | 1 | 0 | 0 | 0 | 0 | 0 | 0 | 0 | 1 | 0 | 0 | 0 | 0 | 1 |
| 0 | 1 | 0 | 1 | 0 | 0 | 1 | 0 | 0 | 0 | 0 | 0 | 0 | 0 | 0 | 0 | 0 — * |
| 0 | 1 | 0 | 1 | 0 | 1 | 0 | 0 | 0 | 0 | 0 | 0 | 0 | 0 | 0 | 0 | 0 — * |
| 0 | 1 | 0 | 1 | 0 | 1 | 1 | 0 | 0 | 0 | 0 | 0 | 0 | 0 | 0 | 0 | 0 — * |
| 0 | 1 | 0 | 1 | 1 | 0 | 0 | 0 | 0 | 0 | 0 | 0 | 0 | 0 | 0 | 0 | 0 |
| 0 | 1 | 0 | 1 | 1 | 0 | 1 | 0 | 0 | 0 | 0 | 0 | 0 | 0 | 0 | 0 | 0 |
| 0 | 1 | 0 | 1 | 1 | 1 | 0 | 0 | 0 | 0 | 0 | 0 | 0 | 0 | 0 | 0 | 0 |
| 0 | 1 | 0 | 1 | 1 | 1 | 1 | 0 | 0 | 0 | 0 | 0 | 0 | 0 | 0 | 0 | 0 |
| 0 | 1 | 1 | 0 | 0 | 0 | 0 | 0 | 0 | 0 | 0 | 0 | 0 | 0 | 0 | 0 | 0 |
| 0 | 1 | 1 | 0 | 0 | 0 | 1 | 0 | 0 | 0 | 0 | 0 | 0 | 0 | 0 | 0 | 0 |
| 0 | 1 | 1 | 0 | 0 | 1 | 0 | 0 | 0 | 0 | 0 | 0 | 0 | 0 | 0 | 0 | 0 |
| 0 | 1 | 1 | 0 | 0 | 1 | 1 | 0 | 0 | 0 | 0 | 0 | 0 | 0 | 0 | 0 | 0 |
| 0 | 1 | 1 | 0 | 1 | 0 | 0 | 0 | 0 | 0 | 0 | 0 | 0 | 0 | 0 | 0 | 0 |
| 0 | 1 | 1 | 0 | 1 | 0 | 1 | 0 | 0 | 0 | 0 | 0 | 0 | 0 | 0 | 0 | 0 |
| 0 | 1 | 1 | 0 | 1 | 1 | 0 | 0 | 0 | 0 | 0 | 0 | 0 | 0 | 0 | 0 | 0 |
| 0 | 1 | 1 | 0 | 1 | 1 | 1 | 0 | 0 | 0 | 0 | 0 | 0 | 0 | 0 | 0 | 0 |
| 0 | 1 | 1 | 1 | 0 | 0 | 0 | 0 | 0 | 0 | 0 | 1 | 0 | 0 | 0 | 0 | 1 |
| 0 | 1 | 1 | 1 | 0 | 0 | 1 | 0 | 0 | 0 | 0 | 0 | 0 | 0 | 0 | 0 | 0 — * |
| 0 | 1 | 1 | 1 | 0 | 1 | 0 | 0 | 0 | 0 | 0 | 0 | 0 | 0 | 0 | 0 | 0 — * |
| 0 | 1 | 1 | 1 | 0 | 1 | 1 | 0 | 0 | 0 | 0 | 0 | 0 | 0 | 0 | 0 | 0 — * |
| 0 | 1 | 1 | 1 | 1 | 0 | 0 | 0 | 0 | 0 | 0 | 0 | 0 | 0 | 0 | 0 | 0 |
| 0 | 1 | 1 | 1 | 1 | 0 | 1 | 0 | 0 | 0 | 0 | 0 | 0 | 0 | 0 | 0 | 0 |
| 0 | 1 | 1 | 1 | 1 | 1 | 0 | 0 | 0 | 0 | 0 | 0 | 0 | 0 | 0 | 0 | 0 |
| 0 | 1 | 1 | 1 | 1 | 1 | 1 | 0 | 0 | 0 | 0 | 0 | 0 | 0 | 0 | 0 | 0 |
| 1 | 0 | 0 | 0 | 0 | 0 | 0 | 0 | 0 | 0 | 1 | 0 | 0 | 0 | 0 | 1 | 0 |
| 1 | 0 | 0 | 0 | 0 | 0 | 1 | 0 | 0 | 0 | 0 | 0 | 0 | 0 | 0 | 0 | 0 |
| 1 | 0 | 0 | 0 | 0 | 1 | 0 | 0 | 0 | 0 | 1 | 0 | 0 | 0 | 1 | 0 | 0 |
| 1 | 0 | 0 | 0 | 0 | 1 | 1 | 0 | 0 | 0 | 1 | 0 | 0 | 0 | 0 | 1 | 0 |
| 1 | 0 | 0 | 0 | 1 | 0 | 0 | 1 | 0 | 0 | 0 | 0 | 0 | 1 | 0 | 0 | 0 |
| 1 | 0 | 0 | 0 | 1 | 0 | 1 | 0 | 1 | 0 | 0 | 0 | 1 | 0 | 0 | 0 | 0 |
| 1 | 0 | 0 | 0 | 1 | 1 | 0 | 1 | 0 | 0 | 0 | 0 | 0 | 1 | 0 | 0 | 0 |
| 1 | 0 | 0 | 0 | 1 | 1 | 1 | 0 | 0 | 0 | 1 | 0 | 0 | 0 | 0 | 1 | 0 |
| 1 | 0 | 0 | 1 | 0 | 0 | 0 | 0 | 1 | 0 | 0 | 1 | 1 | 0 | 0 | 0 | 1 |
| 1 | 0 | 0 | 1 | 0 | 0 | 1 | 0 | 0 | 0 | 1 | 0 | 0 | 0 | 1 | 0 | 0 — * |
| 1 | 0 | 0 | 1 | 0 | 1 | 0 | 0 | 1 | 0 | 0 | 0 | 1 | 0 | 0 | 0 | 0 — * |
| 1 | 0 | 0 | 1 | 0 | 1 | 1 | 0 | 0 | 0 | 1 | 0 | 0 | 0 | 0 | 1 | 0 — * |
| 1 | 0 | 0 | 1 | 1 | 0 | 0 | 1 | 0 | 0 | 0 | 0 | 1 | 0 | 0 | 0 | 0 |

TABLE IV-continued

| | TRANSITION INSTRUCTOR INPUTS | | | | | | CONTROL MODULE OUTPUTS | | | | | CASCADED OUTPUT FOR TWO CONTROL MODULES | | | | | |
|---|---|---|---|---|---|---|---|---|---|---|---|---|---|---|---|---|---|
| DI | X | Y | $y_3$ | $y_2$ | $y_1$ | $y_0$ | U | D | L | R | SEQ_VALID | $A_1$ | $A_0$ | $B_1$ | $B_0$ | SEQ_VALID | |
| 1 | 0 | 0 | 1 | 1 | 0 | 1 | 0 | 0 | 0 | 0 | 0 | 0 | 0 | 0 | 0 | 0 | |
| 1 | 0 | 0 | 1 | 1 | 1 | 0 | 1 | 0 | 0 | 0 | 0 | 1 | 0 | 0 | 0 | 0 | |
| 1 | 0 | 0 | 1 | 1 | 1 | 1 | 1 | 0 | 0 | 0 | 0 | 1 | 0 | 0 | 0 | 0 | |
| 1 | 0 | 1 | 0 | 0 | 0 | 0 | 0 | 0 | 0 | 0 | 0 | 0 | 0 | 0 | 0 | 0 | |
| 1 | 0 | 1 | 0 | 0 | 0 | 1 | 0 | 0 | 1 | 0 | 0 | 0 | 0 | 0 | 1 | 0 | |
| 1 | 0 | 1 | 0 | 0 | 1 | 0 | 0 | 0 | 0 | 1 | 0 | 0 | 0 | 1 | 0 | 0 | |
| 1 | 0 | 1 | 0 | 0 | 1 | 1 | 0 | 0 | 0 | 1 | 0 | 0 | 0 | 0 | 1 | 0 | |
| 1 | 0 | 1 | 0 | 1 | 0 | 0 | 1 | 0 | 0 | 0 | 0 | 0 | 1 | 0 | 0 | 0 | |
| 1 | 0 | 1 | 0 | 1 | 0 | 1 | 0 | 0 | 0 | 0 | 0 | 0 | 0 | 0 | 0 | 0 | |
| 1 | 0 | 1 | 0 | 1 | 1 | 0 | 1 | 0 | 0 | 0 | 0 | 0 | 1 | 0 | 0 | 0 | |
| 1 | 0 | 1 | 0 | 1 | 1 | 1 | 0 | 0 | 1 | 0 | 0 | 0 | 0 | 1 | 0 | 0 | |
| 1 | 0 | 1 | 1 | 0 | 0 | 0 | 0 | 0 | 0 | 0 | 1 | 0 | 0 | 0 | 0 | 1 | |
| 1 | 0 | 1 | 1 | 0 | 0 | 1 | 0 | 0 | 0 | 1 | 0 | 0 | 0 | 1 | 0 | 0 | — * |
| 1 | 0 | 1 | 1 | 0 | 1 | 0 | 0 | 1 | 0 | 0 | 0 | 1 | 0 | 0 | 0 | 0 | — * |
| 1 | 0 | 1 | 1 | 0 | 1 | 1 | 0 | 0 | 0 | 1 | 0 | 0 | 0 | 0 | 1 | 0 | — * |
| 1 | 0 | 1 | 1 | 1 | 0 | 0 | 1 | 0 | 0 | 0 | 0 | 1 | 0 | 0 | 0 | 0 | |
| 1 | 0 | 1 | 1 | 1 | 0 | 1 | 0 | 0 | 0 | 1 | 0 | 0 | 0 | 1 | 0 | 0 | |
| 1 | 0 | 1 | 1 | 1 | 1 | 0 | 1 | 0 | 0 | 0 | 0 | 1 | 0 | 0 | 0 | 0 | |
| 1 | 0 | 1 | 1 | 1 | 1 | 1 | 0 | 0 | 0 | 0 | 0 | 0 | 0 | 0 | 0 | 0 | |
| 1 | 1 | 0 | 0 | 0 | 0 | 0 | 0 | 0 | 0 | 0 | 0 | 0 | 0 | 0 | 0 | 0 | |
| 1 | 1 | 0 | 0 | 0 | 0 | 1 | 0 | 0 | 0 | 1 | 0 | 0 | 0 | 1 | 0 | 0 | |
| 1 | 1 | 0 | 0 | 0 | 1 | 0 | 0 | 0 | 0 | 1 | 0 | 0 | 0 | 1 | 0 | 0 | |
| 1 | 1 | 0 | 0 | 0 | 1 | 1 | 0 | 0 | 0 | 0 | 0 | 0 | 0 | 0 | 0 | 0 | |
| 1 | 1 | 0 | 0 | 1 | 0 | 0 | 1 | 0 | 0 | 0 | 0 | 0 | 1 | 0 | 0 | 0 | |
| 1 | 1 | 0 | 0 | 1 | 0 | 1 | 0 | 0 | 1 | 0 | 0 | 0 | 0 | 0 | 1 | 0 | |
| 1 | 1 | 0 | 0 | 1 | 1 | 0 | 1 | 0 | 0 | 0 | 0 | 0 | 1 | 0 | 0 | 0 | |
| 1 | 1 | 0 | 0 | 1 | 1 | 1 | 0 | 0 | 0 | 1 | 0 | 0 | 0 | 0 | 1 | 0 | |
| 1 | 1 | 0 | 1 | 0 | 0 | 0 | 0 | 1 | 0 | 0 | 1 | 1 | 0 | 0 | 0 | 1 | |
| 1 | 1 | 0 | 1 | 0 | 0 | 1 | 0 | 0 | 0 | 1 | 0 | 0 | 0 | 1 | 0 | 0 | — * |
| 1 | 1 | 0 | 1 | 0 | 1 | 0 | 0 | 1 | 0 | 0 | 0 | 1 | 0 | 0 | 0 | 0 | — * |
| 1 | 1 | 0 | 1 | 0 | 1 | 1 | 0 | 0 | 0 | 1 | 0 | 0 | 0 | 0 | 1 | 0 | — * |
| 1 | 1 | 0 | 1 | 1 | 0 | 0 | 0 | 0 | 0 | 0 | 0 | 0 | 0 | 0 | 0 | 0 | |
| 1 | 1 | 0 | 1 | 1 | 0 | 1 | 1 | 0 | 0 | 0 | 0 | 1 | 0 | 0 | 0 | 0 | |
| 1 | 1 | 0 | 1 | 1 | 1 | 0 | 0 | 0 | 0 | 1 | 0 | 0 | 0 | 1 | 0 | 0 | |
| 1 | 1 | 0 | 1 | 1 | 1 | 1 | 1 | 0 | 0 | 0 | 0 | 1 | 0 | 0 | 0 | 0 | |
| 1 | 1 | 1 | 0 | 0 | 0 | 0 | 0 | 0 | 0 | 0 | 0 | 0 | 0 | 0 | 0 | 0 | |
| 1 | 1 | 1 | 0 | 0 | 0 | 1 | 0 | 0 | 1 | 0 | 0 | 0 | 0 | 1 | 0 | 0 | |
| 1 | 1 | 1 | 0 | 0 | 1 | 0 | 0 | 0 | 0 | 1 | 0 | 0 | 0 | 1 | 0 | 0 | |
| 1 | 1 | 1 | 0 | 0 | 1 | 1 | 0 | 1 | 0 | 0 | 0 | 0 | 1 | 0 | 0 | 0 | |
| 1 | 1 | 1 | 0 | 1 | 0 | 0 | 1 | 0 | 0 | 0 | 0 | 0 | 1 | 0 | 0 | 0 | |
| 1 | 1 | 1 | 0 | 1 | 0 | 1 | 0 | 0 | 1 | 0 | 0 | 0 | 0 | 1 | 0 | 0 | |
| 1 | 1 | 1 | 0 | 1 | 1 | 0 | 1 | 0 | 0 | 0 | 0 | 0 | 1 | 0 | 0 | 0 | |
| 1 | 1 | 1 | 0 | 1 | 1 | 1 | 0 | 0 | 0 | 0 | 0 | 0 | 0 | 0 | 0 | 0 | |
| 1 | 1 | 1 | 1 | 0 | 0 | 0 | 0 | 0 | 0 | 0 | 1 | 0 | 0 | 0 | 0 | 1 | |
| 1 | 1 | 1 | 1 | 0 | 0 | 1 | 0 | 0 | 0 | 1 | 0 | 0 | 0 | 1 | 0 | 0 | — * |
| 1 | 1 | 1 | 1 | 0 | 1 | 0 | 0 | 1 | 0 | 0 | 0 | 1 | 0 | 0 | 0 | 0 | — * |
| 1 | 1 | 1 | 1 | 0 | 1 | 1 | 0 | 0 | 0 | 1 | 0 | 0 | 0 | 0 | 1 | 0 | — * |
| 1 | 1 | 1 | 1 | 1 | 0 | 0 | 0 | 1 | 0 | 0 | 0 | 0 | 1 | 0 | 0 | 0 | |
| 1 | 1 | 1 | 1 | 1 | 0 | 1 | 1 | 0 | 0 | 0 | 0 | 1 | 0 | 0 | 0 | 0 | |
| 1 | 1 | 1 | 1 | 1 | 1 | 0 | 0 | 0 | 0 | 0 | 0 | 0 | 0 | 0 | 0 | 0 | |
| 1 | 1 | 1 | 1 | 1 | 1 | 1 | 0 | 0 | 0 | 1 | 0 | 0 | 0 | 0 | 1 | 0 | |

The 4×4 module represented in ROM Table IV uses the direction symbols U, D, L, and R. The two 2×2 modules represented in the table have direction symbols consisting of module identifiers A or B, and subscripts 1 or 0 to indicate the position of the direction bit that is changing. For example, a 1 placed in the $A_1$ column of the ROM table would indicate that the most significant direction bit of module A is changing, or a 1 in the $B_0$ column would indicate that the least significant direction bit of module B is changing, etc.

Table IV, the lines flagged with an asterisk (*) represent states which are not used on the state diagram. They are coded to force the machine back into the initialization state, state-a. By coding the undefined states in this manner, the machine will always be able to recover if it gets "lost".

It is more likely that the controller microcode programming will be provided using a PLA type device rather than the ROM programming presented. A reduced p-term table constructed from Karnaugh maps based on the ROM programming of Table IV is presented in Table V. There are 19 p-terms including the output SEQ_VALID. No hazards are present so no hazard cover is necessary. Had the p-term table been constructed directly from the state diagram of FIG. 18, 21 p-terms would have resulted.

TABLE V

| TRANSITION INSTRUCTOR INPUTS* | | | | | | CONTROL MODULE OUTPUTS | | | | CONTROLLER OUTPUT |
|---|---|---|---|---|---|---|---|---|---|---|
| $y_3$ | $y_2$ | $y_1$ | $y_0$ | X | Y | U | D | L | R | SEQ_VALID |
| 1 | 1 | — | 0 | 0 | — | 1 | 0 | 0 | 0 | 0 |
| 1 | 1 | 0 | 1 | 1 | — | 1 | 0 | 0 | 0 | 0 |
| 1 | 1 | 1 | 1 | — | 0 | 1 | 0 | 0 | 0 | 0 |
| 0 | 1 | — | 0 | — | — | 1 | 0 | 0 | 0 | 0 |
| 0 | 0 | 1 | 1 | 1 | 1 | 0 | 1 | 0 | 0 | 0 |
| 0 | 1 | 0 | 1 | 0 | 0 | 0 | 1 | 0 | 0 | 0 |
| 1 | 1 | 0 | 0 | 1 | 0 | 0 | 1 | 0 | 0 | 0 |
| 1 | 0 | 0 | 0 | — | 0 | 0 | 1 | 0 | 0 | 0 |
| 0 | 0 | 0 | 1 | — | 1 | 0 | 0 | 1 | 0 | 0 |

TABLE V-continued

| TRANSITION INSTRUCTOR INPUTS* | | | | | | CONTROL MODULE OUTPUTS | | | | CONTROLLER OUTPUT |
|---|---|---|---|---|---|---|---|---|---|---|
| y3 | y2 | y1 | y0 | X | Y | U | D | L | R | SEQ_VALID |
| 0 | 1 | 0 | 1 | 1 | — | 0 | 0 | 1 | 0 | 0 |
| 0 | 1 | 1 | 1 | 0 | 1 | 0 | 0 | 1 | 0 | 0 |
| 0 | 0 | — | 0 | 0 | 0 | 0 | 0 | 0 | 1 | 0 |
| 0 | 0 | 0 | 1 | 1 | 0 | 0 | 0 | 0 | 1 | 0 |
| 0 | 0 | 1 | — | 0 | — | 0 | 0 | 0 | 1 | 0 |
| 0 | 1 | 1 | 1 | — | 0 | 0 | 0 | 0 | 1 | 0 |
| 1 | 1 | 0 | 1 | 0 | 1 | 0 | 0 | 0 | 1 | 0 |
| 1 | 1 | 1 | 1 | 1 | 1 | 0 | 0 | 0 | 1 | 0 |
| 1 | 1 | 1 | 0 | 1 | 0 | 0 | 0 | 0 | 1 | 0 |
| 1 | 0 | 0 | 0 | — | — | 0 | 0 | 0 | 0 | 1 |

*Input DI is understood to be ACTIVE for all entries

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. An electronic asynchronous digital controller, comprising:
    means for receiving information indicative of at least one system input;
    means for storing a present state code which is indicative of a present state which the controller has assumed from a plurality of possible states;
    means for transitioning said means for storing a present state code, from one state code to another state code;
    means for analyzing the present state code to determine a state class associated with the present state from at least two possible state classes;
    means for analyzing the present state code and system inputs to determine whether transition instructions should issue;
    means for issuing transition instructions indicating any desired state transition which should be made;
    transition control means for detecting the issuance of any transition instruction and assuring that any previous transition has been sufficiently completed and then providing a transition command signal to said means for transitioning to thus cause said means for storing a present state code to transition from the present state which is classified in a first state class, into a new present state which is classified in a second state class different from said first state class; and
    means for translating the new present state code into appropriate output signals used to control related equipment.

2. The digital controller of claim 1 further comprising means for deactivating transition instructions.

3. The digital controller of claim 2 wherein said means for deactivating is active after transition to a new present state has occurred.

4. The digital controller of claim 1 wherein said means for deactivating is active after transition to a new present state has occurred, and until at least the transition command signal is ended.

5. The digital controller of claim 1 wherein the state codes are classified into even and odd parity state classes.

6. The digital controller of claim 1 wherein said means for analyzing the present state code and system inputs, and said means for issuing transition instructions are integrated.

7. The digital controller of claim 1 wherein there are a plurality of distinct transition command signals which can issue, each transition command signal being associated with a different state class.

8. The digital controller of claim 1 wherein said transition control means includes means for detecting an active transition instruction and parallel transition control channels which exist for each state class.

9. The digital controller of claim 8 wherein the means for detecting an active transition instruction includes a combinational logic device having an asserted output when transition instructions exist for any branching alternative.

10. The digital logic controller of claim 9 wherein the parallel timing control channels each include:
    a) a combinational logic device producing an asserted output when: the present state is of a specific state class associated with a timing control channel; transition command signals from all other timing control channels are not asserted, and a transition instruction is asserted; and
    b) a sequential logic device which is reset when there is no transition instruction being issued and set when the output of said combination logic device produces an asserted output, thus producing an asserted transition command signal.

11. The digital controller of claim 10 wherein the parallel timing control channels each include a NAND gate equivalent as the combinational logic device, and a flip-flop equivalent as the sequential logic device; the outputs from the sequential logic devices being connected to said means for transitioning thereby acting to provide the transition command signals.

12. The digital controller of claim 1 wherein said means for storing present state code is a programmable logic array means.

13. The digital controller of claim 1 wherein said means for analyzing the present state code and system inputs is a programmable logic array means.

14. The digital controller of claim 6 wherein said means for analyzing the present state code and system inputs and said means for issuing transition instructions is a programmable logic array means.

15. The digital controller of claim 1 wherein said means for storing a present state code, and said means for transitioning are integrated.

16. The digital controller of claim 1 wherein said means for storing a present state code, and said means for transitioning are a programmable logic array means.

17. The digital controller of claim 1 wherein said means for storing a present state code, and said means for transitioning are a read only memory means.

18. The digital controller of claim 1 wherein said means for analyzing the present state code and system inputs, and said means for issuing transition instructions are a programmable logic array means.

19. The digital controller of claim 1 wherein said means for analyzing the present state code and system inputs, and said means for issuing transition instructions are a read only memory means.

20. The digital controller of claim 1 wherein said means for storing a present state code is included in a state array machine and said transition control means includes a timing control machine.

21. The digital controller of claim 1 wherein said means for analyzing the present state code and system inputs is programmable.

22. The digital controller of claim 21 wherein said means for analyzing the present state code and system inputs is programmed.

23. The digital controller of claim 21 wherein said means for analyzing the present state code and system inputs is programmable by interchangeably replacing a programmed digital device providing defined outputs for a given set of inputs thereto.

24. A programmable, asynchronous digital logic controller comprising:
   means for receiving information indicative of at least one system input;
   means for storing a digital present state code which is indicative of a present state which the controller has assumed from a plurality of possible states;
   means for transitioning said means for storing a digital present state code, from one state code to another state code;
   means for analyzing the state code to determine a state class associated with the present state from at least two possible state classes;
   a programmable means for analyzing the present state code and system inputs to provide transition instructions indicating appropriate transition branching which should be made in order to transition the controller from the present state into a next state which when implemented shall become the new present state;
   transition control means for detecting transition instructions from said programmable means for analyzing, detecting whether a previous transition has been completed, and to provide a transition command signal to said means for transitioning to thus trigger said means for transitioning to transition from the present state which is classified in a first state class, into a new present state which is classified in a second state class different from said first state class;
   means for resetting the transition timing control means; and
   means for translating a present state code into appropriate output signals from the controller so that associated systems are controlled thereby.

25. An asynchronous digital control module used with a programmed digital device; said programmed digital device receiving system inputs and providing system outputs based upon such system inputs and an operational state assumed by the digital control module, said programmed digital device further providing transition instructions indicating appropriate transition branching which should occur for changing the module from one state to another state; comprising:
   means for storing a digital present state code which is indicative of a present state which the control module has assumed from various possible states which can be assumed;
   means for transitioning said means for storing a digital present state code, from one state code to another state code;
   means for analyzing the present state code to determine a state class associated with a particular present state from a plurality of alternative state classes associated with various states which can be assumed by said means for storing a digital present state code.
   transition control means for detecting transition instructions from said programmed digital device, for detecting whether a previous transition has been completed, and to provide a transition command signal to said means for transitioning to thus trigger said means for storing a present state code to transition from the present state which is classified in a first state class, into a new present state which is classified in a second state class different from said first state class; and
   means for communicating the present state code to said programmable digital device.

26. The control module of claim 25 further comprising deactivate input means for deactivating implementation of transition instructions from the programmed digital device to the control module.

27. The control module of claim 25 wherein the means for storing a digital present state code is a programmable logic array providing an output which encodes the present state code.

28. The control module of claim 25 wherein the transition control means has channels associated with the various state classes.

29. The control module of claim 25 wherein the transition control means receives at least one class signal from said means for analyzing the present state code to determine a state class, which is indicative of the class of the present state; said class signal being input to a gate which also receives input indicating whether previous transitions have been sufficiently completed.

30. The control module of claim 25 wherein the transition control means includes at least one transition assurance means and bistable latch means for each state class.

31. The control module of claim 30 wherein the transition assurance means is a gate which receives inputs indicating the state class of the present state and a signal indicative of whether transitioning has been completed by the means for storing a digital present state code.

32. The control module of claim 31 wherein said signal indicative of whether transitioning has been completed is a transition command signal.

33. The control module of claim 25 wherein the transition control means includes a transition assurance means which determines if all prior transitions have been sufficiently completed and controls issuance of at least one transition command signal.

34. The control module of claim 33 wherein the transition control means further includes a bistable latch means receiving input from the transition assurance means and a means for resetting.

35. The control module of claim 33 wherein there are distinct channels in the transition control means associated with each of the plurality of state classes.

36. The control module of claim 35 wherein each distinct channel includes a gate whose output is dependent upon the issuance of a transition instruction, the class of the present state, and whether a previous transition has been sufficiently completed.

37. The control module of claim 36 wherein the gate is a NAND gate equivalent.

38. The control module of claim 37 wherein the transition control means further includes a bistable latch means for each channel.

39. The control module of claim 25 further comprising a disable input subcircuit for disabling input of transition instructions.

40. An electronic asynchronous digital controller module comprising:
   means for storing a present state code which is indicative of a present state which the controller module has assumed from a plurality of possible states;
   means for transitioning said means for storing a present state code, from one state code to another state code;
   classification means for determining a classification of the present state code and providing distinct state class signals for each state classification into which a state code may be classified;
   transition control means which receives the distinct state class signals as inputs to parallel transition control channels for each of the state classes; each channel including a transition assurance means which assures that any previous transition of the controller module have been sufficiently completed and bistable latch means receiving input from the transition assurance means.

41. The controller means of claim 40 further comprising at least one reset subcircuit for resetting the bistable latch means.

42. The controller module of claim 41 further comprising a disable input means.

43. The controller of claim 42 wherein the transition assurance means is a NAND gate equivalent.

44. An electronic asynchronous digital logic controller, comprising:
   a state array machine comprising:
   a) means for storing a digital present state code which is indicative of a present state which the controller has assumed;
   b) means for determining a state class associated with the present state from a plurality of alternative state classes which include the various states which may be assumed by the state array machine;
   c) means for transitioning from a present state into a new present state upon receipt of a transition command signal; and
   d) means for receiving transition instructions;
   means for analyzing the present state code and system inputs to provide transition instructions indicating a change which should be made to the state code during a transition;
   a transition control machine comprising:
   a) means for detecting when a transition instruction is asserted by said means for analyzing;
   b) means for determining whether a prior transition has been completed; and
   c) means for issuing a transition command signal to the state array machine to thus produce a transition from a present state into a new present state; and
   means for allowing the transition control machine to reset after issuing a transition command signal.

45. The controller of claim 44 wherein said means for analyzing the present state code and system inputs is programmable.

46. The controller of claim 44 wherein said means for analyzing the present state code and system inputs is programmed for the particular control function for which the controller is intended.

47. An asynchronous digital logic control module used with a programmable digital device; said programmable digital device receiving system inputs and providing system outputs based upon operational states assumed by the digital logic control module, said programmable digital device further providing transition instructions for changing the module from one state to another state; comprising:
   a state array machine comprising:
   a) means for storing a digital present state code which is indicative of a present state which the controller has assumed;
   b) means for transitioning from a present state into a new present state upon receipt of a transition command signal;
   c) means for receiving transition instructions;
   d) means for analyzing the present state code to determine a state class associated with the present state;
   a transition control machine comprising:
   a) means for detecting when a transition instruction is asserted by said programmable digital device;
   b) means for determining whether a prior transition has been completed;
   c) means for issuing a transition command signal to the state array machine to thus produce a transition from a present state into a new present state; and
   means for allowing the transition control machine to reset after issuing a transition command signal.

48. A method for asynchronously controlling a digital system using a digital controller, comprising:
   receiving at least one system input from the digital system;
   storing present state information which is indicative of a present state which is assumed by the digital controller;
   analyzing the system input and present state information against preprogrammed information to produce a transition instruction indicating any state transition which should occur;
   classifying the present state information to provide at least one classification signal indicative of the classification of said present state;
   producing at least one transition command signal when all previous transitions have been completed by the controller and the transition instruction is appropriate for transitioning from the present state into a new state having a classification different from the present state; and
   transitioning the present state information from a present state into a new present state having a different state code classification.

49. A method according to claim 48 wherein the present state information is classified into even or odd parity states.

50. A method according to claim 48 wherein distinct transition command signals are produced for each different state code classification.

51. A method according to claim 48 and further comprising:
   reclassifying the present state information in light of the transitioning step;
   disabling input of transition instructions to allow resetting of a transition control means; and
   re-enabling of transition instructions after the transition control means has been reset.

52. An electronic asynchronous digital controller, comprising:
   a control module and a transition instructor, said control module having means for storing a preset state code indicating a state assumed by the control module; said transition instructor having means for receiving information indicating the present state code of the control module, means for receiving additional information indicating system input variables of the digital system being controlled, and means for providing transition instructions to the control module indicating a transition is needed in the control module to assume a new present state; said control module having means for transitioning alternately between at least a first class associated with state codes of a first classification, and a second class associated with state codes of a second classification which is different from said first classification; the control module also including transition control means for issuing transition command signals to trigger transition of the control module after previous transitions have been completed.

53. The digital controller of claim 52 wherein the control module comprises means for allowing only one bit to change during any particular transition.

54. A digital controller according to claim 52 wherein there are a plurality of control modules connected to the transition instructor.

55. A digital controller according to claim 52 wherein the control module is constructed on a separate integrated circuit from the transition instructor and the transition instructor is adapted for allowing different alternative transition instructions to be used to provide controllers having different functional attributes.

56. An electronic asynchronous digital logic controller, comprising:

means for analyzing a present state code and system inputs to provide transition instructions indicating a change which should be made to the state code;
a state array machine comprising:
a) means for storing a digital present state code which is indicating of a present state which the controller has assumed from a plurality of possible states;
b) means for determining a state class associated with the present state from a plurality of alternative state classes which include the various states which may be assumed by the state array machine;
c) means for detecting when a transition instruction is asserted by said means for analyzing;
d) means for determining whether all prior transitions have been completed and then issuing a transition request signal corresponding to said state class;
e) means for transitioning from a present state into a new present state upon receipt of a transition command signal, the new present state having a state class different than the original present state; and
f) means for determining when the previous transition instruction has become inactive and then issuing a transition completion signal;
a timing control machine comprising:
a) means for receiving transition request signals from said state array machine;
b) means for issuing a transition command signal corresponding to said transition request signal;
c) means for receiving said transition completion signal from said state array machine;
d) means for maintaining said transition command signal in its active condition until said transaction completion signal is received.

* * * * *